US010099703B2

(12) United States Patent
Tanaka et al.

(10) Patent No.: US 10,099,703 B2
(45) Date of Patent: Oct. 16, 2018

(54) VEHICULAR SYSTEM, ECU, STORING INSTRUCTION TRANSMISSION DEVICE, AND STORING REQUEST TRANSMISSION DEVICE

(71) Applicant: DENSO CORPORATION, Kariya, Aichi-pref. (JP)

(72) Inventors: Masahiko Tanaka, Anjo (JP); Mitsuyoshi Natsume, Hekinan (JP); Yasuyuki Takahashi, Okazaki (JP); Yuzo Harata, Chiryu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/209,787

(22) Filed: Jul. 14, 2016

(65) Prior Publication Data

US 2016/0318522 A1 Nov. 3, 2016

Related U.S. Application Data

(62) Division of application No. 14/288,473, filed on May 28, 2014, now abandoned, which is a division of
(Continued)

(30) Foreign Application Priority Data

Mar. 18, 2011 (JP) .................................. 2011-61098
Jan. 17, 2012 (JP) .................................... 2012-7346

(51) Int. Cl.
 *B60W 50/04* (2006.01)
 *H04L 12/40* (2006.01)

(52) U.S. Cl.
 CPC ....... *B60W 50/04* (2013.01); *H04L 12/40091* (2013.01); *H04L 2012/40273* (2013.01)

(58) Field of Classification Search
 CPC ........ B60W 50/04; B60R 16/02; B60R 21/32; H04L 12/40091; H04L 2012/40273
(Continued)

(56) References Cited

U.S. PATENT DOCUMENTS 5,491,631 A * 2/1996 Shirane ................... F02D 41/22
 123/479
6,321,148 B1 * 11/2001 Leung ................. B60R 16/0232
 370/241

(Continued)

FOREIGN PATENT DOCUMENTS

JP 2000-146765 A 5/2000
JP 2002-193070 A 7/2002
(Continued)

OTHER PUBLICATIONS

Office Action dated Oct. 8, 2013 in corresponding JP Application No. 2012-007346 (with English translation).

*Primary Examiner* — Charles J Han
(74) *Attorney, Agent, or Firm* — Harness, Dickey & Pierce, P.L.C.

(57) ABSTRACT

A vehicular system includes a master ECU, a first slave ECU, and a second slave ECU. The second slave ECU transmits a storing request to the master ECU on detection of a malfunction. The master ECU transmits a storing instruction for causing diagnostic information to be stored, on reception of the storing request. The first slave ECU generates diagnostic information on the first slave ECU, on reception of the storing instruction from the master ECU. The first slave ECU further stores the generated diagnostic information in a retention storage medium. The retention storage medium is configured to retain validity determination information in a condition where the first slave ECU is not supplied with electric power source.

4 Claims, 8 Drawing Sheets

Related U.S. Application Data application No. 13/419,903, filed on Mar. 14, 2012, now abandoned.

(58) Field of Classification Search
USPC .................. 701/29.1, 29.7, 34.3, 33.4, 34.4
See application file for complete search history.

(56) References Cited

U.S. PATENT DOCUMENTS

| | | | |
|---|---|---|---|
| 8,321,086 B2 | 11/2012 | Park et al. | |
| 2008/0306650 A1* | 12/2008 | Nakagaki | G05B 23/0264 |
| | | | 701/33.4 |

FOREIGN PATENT DOCUMENTS

| | | | |
|---|---|---|---|
| JP | 2002193070 A | * | 7/2002 |
| JP | 2003-229873 A | | 8/2003 |
| JP | 2010-173615 A | | 8/2010 |

\* cited by examiner

VEHICULAR SYSTEM, ECU, STORING INSTRUCTION TRANSMISSION DEVICE, AND STORING REQUEST TRANSMISSION DEVICE

CROSS REFERENCE TO RELATED APPLICATION

This application is a divisional of U.S. patent application Ser. No. 14/288,473 filed on May 28, 2014 which is a divisional of U.S. patent application Ser. No. 13/419,903 filed on Mar. 14, 2012. This application is based on Japanese Patent Applications No. 2011-61098 filed on Mar. 18, 2011 and No. 2012-7346 filed on Jan. 17, 2012, the disclosures of which are incorporated herein by reference.

TECHNICAL FIELD

The present disclosure relates to a vehicular system, an electronic control unit (ECU), a storing instruction transmission device, and a storing request transmission device.

BACKGROUND

For example, JP-A-2003-229873 discloses a conventional vehicular system including multiple electronic control units (ECUs). In the configuration of JP-A-2003-229873, when a certain ECU detects a malfunction, diagnostic information on the ECU is stored in a storage medium, and the stored diagnostic information is read by using a diagnostic tool at a repair shop of the vehicle.

In view of a complicated control system in a vehicle in recent years, new configuration for identifying a malfunction is demanded.

SUMMARY

It is an object of the present disclosure to enable an ECU to store diagnostic information on detection of a malfunction in another certain ECU in a vehicular system equipped with multiple ECUs.

In recent years, control systems in a vehicle have been complicated. The inventors of the present disclosure have studied recent vehicular control systems and consequently focused on multiple ECUs cooperating bilaterally in recent vehicular systems to control vehicular devices. In such a complicated system, for example, when a certain ECU detects a malfunction, It may be insufficient for specifying the cause of the malfunction only with diagnostic information of the certain ECU.

In consideration of the study result, according to an aspect of the present disclosure, a vehicular system equipped to a vehicle, the vehicular system comprises a master ECU. The vehicular system further comprises a first slave ECU. The vehicular system further comprises a second slave ECU. The second slave ECU is configured to transmit a storing request to the master ECU on detection of a malfunction. The master ECU is configured to transmit a storing instruction on reception of the storing request. The first slave ECU is configured, on reception of the storing instruction from the master ECU: to generate diagnostic information on the first slave ECU; and to store the generated diagnostic information in a retention storage medium, the retention storage medium being configured to retain validity determination information in a condition where the first slave ECU is not supplied with electric power.

According to another aspect of the present disclosure, a vehicular system equipped to a vehicle, the vehicular system comprises a first ECU. The vehicular system further comprises a second ECU. The first ECU is configured to transmit a storing instruction on detection of a malfunction. The second ECU is configured, on reception of the storing instruction transmitted from the first ECU: to generate diagnostic information on the second ECU; and to store the generated diagnostic information on the second ECU in a retention storage medium, the retention storage medium being configured to retain validity determination information in a condition where the second ECU is not supplied with electric power.

According to another aspect of the present disclosure, an ECU equipped to a vehicle, the ECU configured, on reception of a storing instruction from an outside: to generate diagnostic information on the ECU; and to store the generated diagnostic information in a retention storage medium, the retention storage medium being configured to retain validity determination information in a condition where the ECU is not supplied with electric power.

According to another aspect of the present disclosure, a storing instruction transmission device configured to transmit a storing instruction to a vehicular ECU, the vehicular ECU being configured, on reception of the storing instruction from an outside: to generate diagnostic information on the storing instruction transmission device; and to store the generated diagnostic information in a retention storage medium, the retention storage medium being configured to retain validity determination information in a condition where the storing instruction transmission device is not supplied with electric power.

According to another aspect of the present disclosure, an ECU communicable with a storing instruction transmission device, the ECU comprises a storing request transmission unit configured, on detection of an anomaly by the ECU, to transmit a first storing request, which includes a first system identification code corresponding to the anomaly, to a storing instruction transmission device thereby to cause the storing instruction transmission device to transmit a first storing instruction, which includes the first system identification code. The ECU further comprises an instruction correspondence storing unit configured: to receive a second storing instruction, when the storing instruction transmission device transmits the second storing instruction on reception of a second storing request from a device other than the ECU; to determine whether to store diagnostic information on the ECU, according to a second system identification code included in the received second storing instruction; and to store diagnostic information, which includes data corresponding to the second system identification code, in a storage medium of the ECU, on determination to store.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
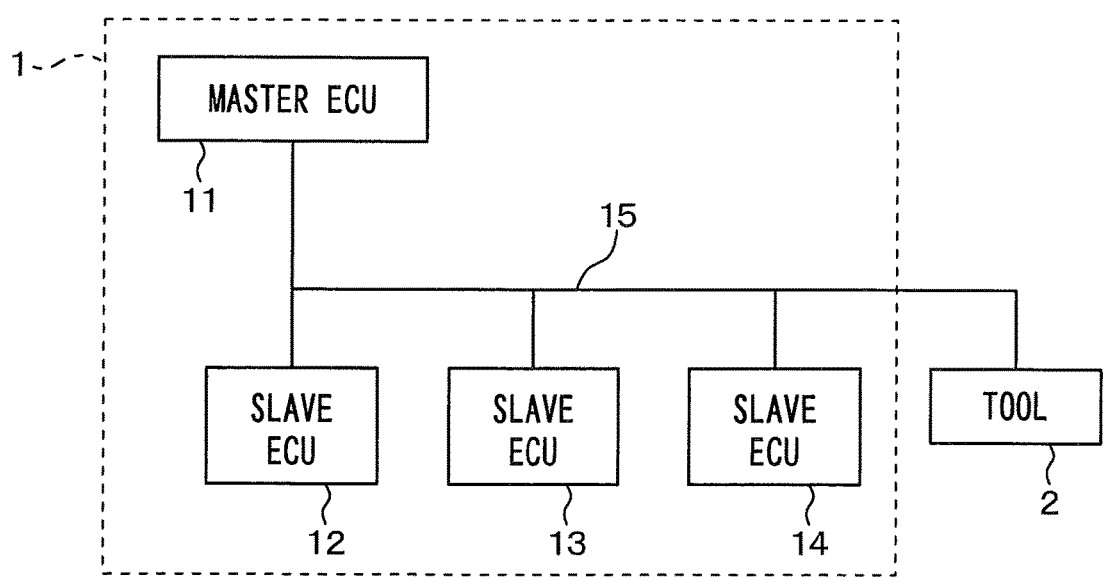
FIG. 1 is a block diagram showing a vehicular system according to an embodiment.

As follows, an embodiment of the disclosure will be described. FIG. 1 is a block diagram showing a vehicular system 1 according to the present embodiment. The vehicular system 1 is equipped to a vehicle for controlling vehicular devices such as a safety device, a power train, a brake mechanism, an airbag, a convenience and comfortable control device, equipped to the vehicle.

The vehicular system 1 includes an electronic control unit (ECU), such as a master ECU 11 and multiple slave ECUs 12 to 14. The vehicular system 1 further includes an in-vehicle LAN 15, such as CAN or FlexRay, as a communication line for communication among the ECUs 11 to 14. The ECUs 11 to 14 are communicable with each other through the in-vehicle LAN 15.

The master ECU 11 generates information, such as a vehicle local time and a simultaneous storing instruction (described later), and transmits the generated information to the slave ECUs 12 to 14 and the like periodically and repeatedly through the in-vehicle LAN 15. The slave ECUs 12 to 14 use the vehicle local time transmitted from the master ECU 11 as an inner time of the self device. The slave ECUs 12 to 14 further transmit a simultaneous storing request to the master ECU 11, on detection of a malfunction. The slave ECUs 12 to 14 further store diagnostic information on reception of a simultaneous storing request from the master ECU 11.

The master ECU 11 is a +B system activated with backup electric power from a battery in both an ON state (IG-ON state) and an OFF state (IG-OFF state) of an ignition device (IG) of the vehicle. The ignition device (IG) of the vehicle is one example of a main power source of the vehicle. In the present embodiment, the master ECU 11 may be a main body ECU for controlling a vehicular device such as a head lamp and/or an interior light. The present configuration may be employed, since the main body ECU is a +B system with high loading rate in a vehicle and includes a retention storage medium. The retention storage medium is, for example, a non-volatile storage media, such as a flash memory, S-RAM, etc., and configured to retain the validity determination information, even when the ECU equipped with the retention storage medium is not supplied with electric power.

Each of the slave ECUs 12 to 14 may be the +B system. Alternatively, each of the slave ECUs 12 to 14 may be an IG system activated with electric power from the battery when the vehicle is in the IG-ON state, and terminated without electric power from the battery when the vehicle is in the IG-OFF state. Alternatively, each of the slave ECUs 12 to 14 may be an ACC system activated with electric power from the battery when an airconditioner of the vehicle is activated in an ACC-ON state, and terminated without electric power from the battery when the airconditioner of the vehicle is deactivated in an ACC-OFF state.

In the present embodiment, it is assumed that the slave ECU 12 and the slave ECU 13 are for controlling a power train of the vehicle, and the slave ECU 13 is for controlling a device of a body system of the vehicle. The ECU for controlling the power train may be, for example, an engine ECU and/or a transmission ECU. The engine ECU is for controlling, for example, fuel supply to an engine, a fuel injection timing, and/or the like. The transmission ECU is for controlling, for example, a transmission device. The device of a body system belongs to a convenience and comfortable control device, such as a door lock system, a door mirror angle adjustment mechanism, and/or the like.

Each of the ECUs 11 to 14 has a hardware configuration including, for example, a communication interface circuit communicable with the in-vehicle LAN 15, the retention storage media such as a flash memory, and a control circuit. The control circuit is configured with a generally-known microcomputer equipped with a CPU, a volatile storage medium such as a RAM and a ROM, a timer, and an I/O device. The CPU executes a program stored in the ROM, arbitrary write data in and read data from the RAM as the retention storage medium, and causes a communication interface circuit to implement communications through the in-vehicle LAN 15. The CPU further receives a detection signal from a sensor (not shown) arbitrary, and controls an actuator (not shown) being a control object.

For example, the master ECU 11 receives a detection signals from devices such as a head lamp operation unit, an interior light operation unit, and/or a sensor, such as a door opening-and-closing sensor for detecting opening and closing of a door. The head lamp operation unit is operated by a driver in order to switch activation and deactivation of a head lamp. The interior light operation unit is operated by a driver in order to switch activation and deactivation of an interior light and automatic control of the interior light. The master ECU 11 further controls the head lamp as an actuator according to the detection signal received from the head lamp operation unit and controls the interior light as an actuator according to the detection signal received from the interior light operation unit and the door opening-and-closing sensor.

For example, the slave ECU 12 receives detection signals from sensors, such as an accelerator position sensor, an engine coolant temperature sensor, an engine revolution sensor, and/or a vehicle speed sensor. The slave ECU 12 further controls an engine throttle valve control mechanism and a fuel injection mechanism as actuators, according to the detection signal retrieved from these sensors.

For example, the slave ECU 13 receives detection signals from sensors, such as the vehicle speed sensor, a drive range sensor, and the engine revolution sensor. The slave ECU 13 further controls the transmission device as an actuator, according to the detection signals received from these sensors.

For example, the slave ECU 14 receives detection signals from sensors, such as the door lock operation unit and a mirror angle adjustment device. The slave ECU 14 controls the door lock system and the door mirror angle adjustment mechanism as actuators, according to the detection signal received from these sensors.

In the following description, a processing implemented by a CPU of a control circuit in an ECU is referred to as a processing implemented by the ECU.

In the present embodiment, the vehicle local time is uniformly used in each of the ECUs 11 to 14 of the vehicular system 1. The vehicle local time is periodically and repeatedly generated by the master ECU 11 and periodically and repeatedly transmitted from the master ECU 11 to the slave ECUs 12 to 14. When recording diagnostic information, the master ECU 11 and the slave ECUs 12 to 14 associate the diagnostic information with the latest vehicle local time and store the associated diagnostic information and the latest vehicle local time.

The pair of the diagnostic information and the vehicle local time, which are associated and stored in each of the ECUs 11 to 14, is transmitted from each of the ECUs 11 to 14 to a diagnostic tool 2 through the in-vehicle LAN 15, when the diagnostic tool 2 is connected to the in-vehicle LAN 15 in a repair shop or the like (describes later).

Figure 2:
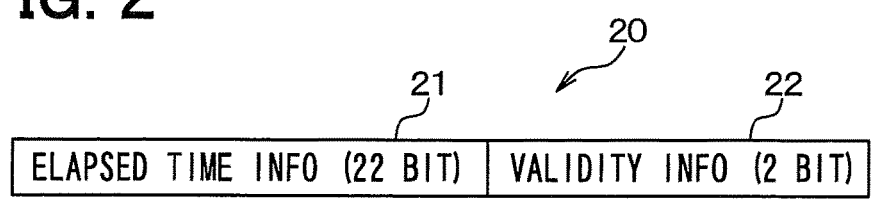
FIG. 2 is a view showing the contents of a vehicle local time.

As shown in FIG. 2, the master ECU 11 stores data about a vehicle local time 20 in a storage medium, such as the RAM and the retention storage medium. Specifically, the vehicle local time 20 includes elapsed time information 21 and validity determination information 22. The master ECU 11 stores the elapsed time information 21 in the RAM and stores the validity determination information 22 in the retention storage medium.

The elapsed time information 21 is 22-bit length data for measurement of the elapsed time information and configured to increment by one-second unit, as the time elapses in cycle order. The elapsed time information 21 has the least significant bit (LSB) representing one second. The validity determination information 22 is 2-bit length data configured to increment by one on one reset of the master ECU 11 in cycle order. Specifically, the validity determination information 22 increments by one on one reset of the CPU of the control circuit of the master ECU 11. The validity determination information 22 has the least significant bit (LSB) representing one reset.

As follows, the configuration of the diagnostic tool 2 will be described. The diagnostic tool 2 includes a communication interface unit, an operation unit, a display device, a time counter device, and a control circuit. The communication interface unit is for connecting with the in-vehicle LAN 15 to communicate with the ECUs 11 to 14. The operation unit accepts a user's operation on a device, such as a button. The display device indicates information. The time counter device measures an absolute time. The absolute time may be a calendar time, which includes the year, the month, the day, the hour, the minute, and the second. The absolute time may be the Coordinated Universal Time (UTC) and/or the like.

The control circuit is configured with a generally-known microcomputer equipped with a CPU, a RAM, a ROM, and an I/O device. The CPU executes a program stored in the ROM, arbitrary write data in and read data from the RAM as the retention storage medium, and causes the communication interface circuit to implement communications with the ECUs 11 to 14 through the in-vehicle LAN 15. The CPU further receives a signal caused by user's operation on the operation unit, causes the display device to indicate information, and receives the present absolute time from the time counter device, thereby to produce specific operation (described later. As follows, the processing implemented by the CPU will be referred to as a processing implemented by the diagnostic tool 2.

It is noted that, the vehicular system 1 does not include a time counter device, such as a GPS receiver, a radio-controlled clock, and a quartz watch, for measuring the absolute time. Alternatively, even when the vehicular system 1 is equipped with a time counter device for measuring the absolute time, the vehicular system 1 does not use the time counter device.

As follows, operation of the vehicular system 1 will be described. The master ECU 11 causes the CPU to execute a predetermined program thereby to implement a vehicle local time generation and transmission processing shown in FIG. 3. The master ECU 11 starts the vehicle local time generation and transmission processing in both cases immediately after the master ECU 11 is reset and immediately after the main power source (IG) of the vehicle is switched from the OFF state into ON state. The case where the master ECU 11 is reset may be caused when the processing of the master ECU 11 is reset by a fail-safe processing. The case where the master ECU 11 starts its operation occurs when, for example, the master ECU 11 is disconnected from the battery of the vehicle, and thereafter, the master ECU 11 is connected with the battery of the vehicle and activated.

Figure 4:
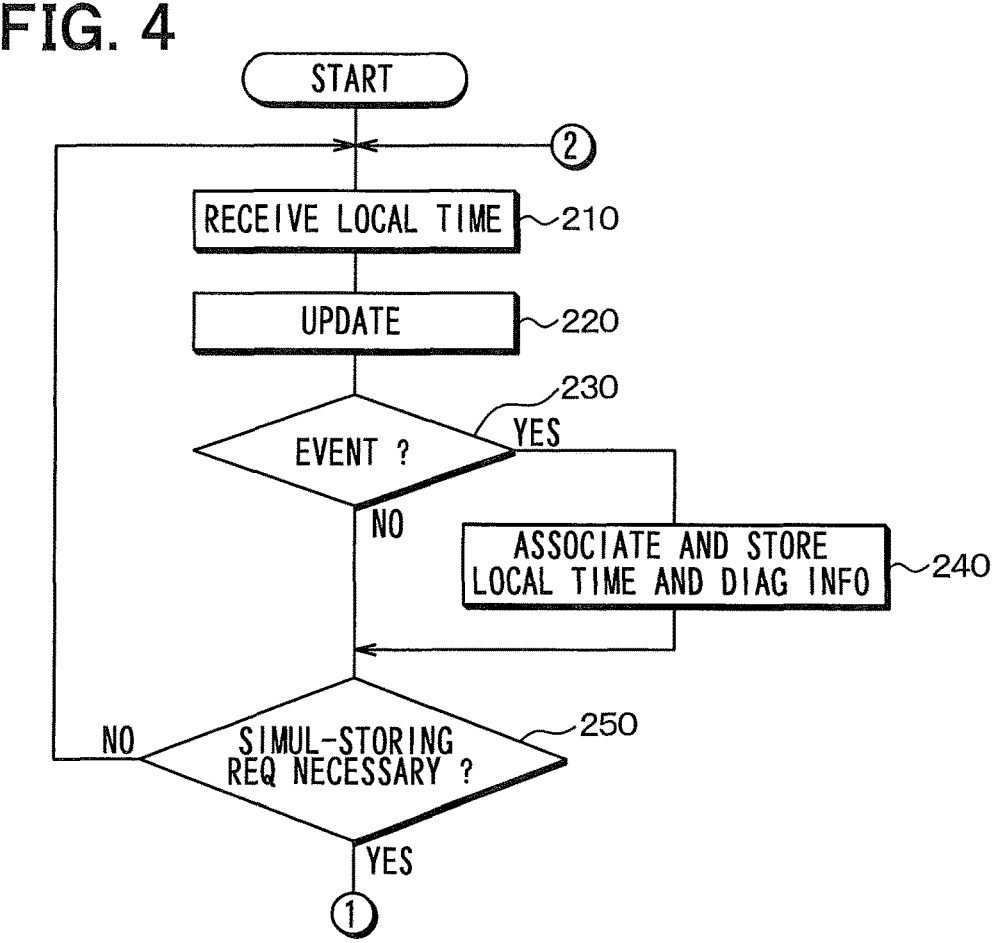
FIG. 4 is a flowchart showing an exchange and record processing implemented by a slave ECU.
Figure 5:
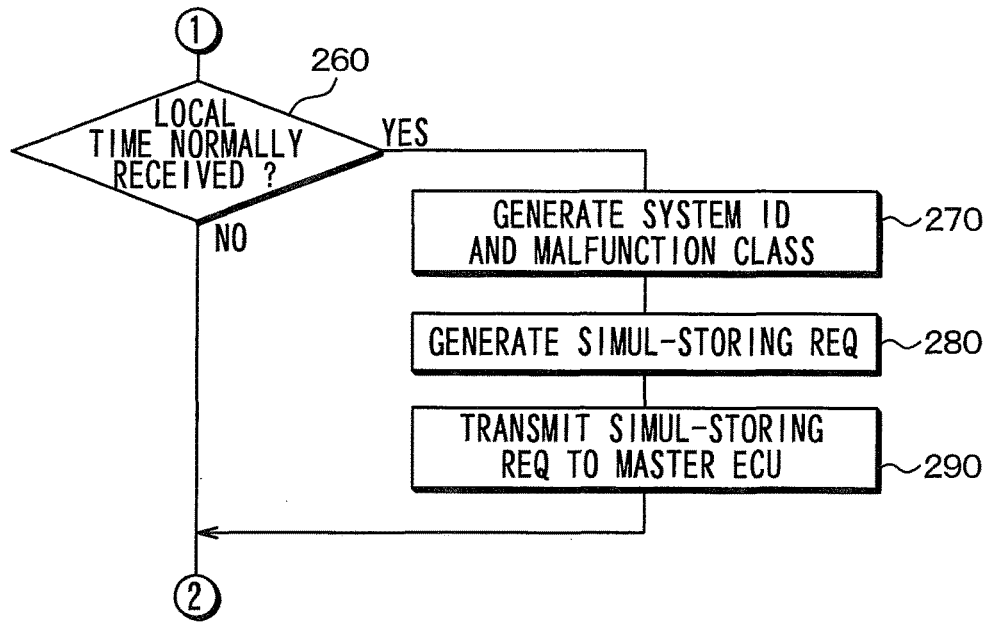
FIG. 5 is a flowchart showing an exchange and record processing implemented by the slave ECU.

Each of the slave ECUs 12 to 14 implements a reception and record processing shown in FIG. 4 and FIG. 5 when the slave ECU starts its operation. Each of the master ECU 11 and the slave ECUs 12 to 14 implements the processing in FIG. 4 and FIG. 5 in parallel with another processing, such as a processing for engine control, a processing for brake control, and a processing for air-conditioning control.

When starting the operation of the vehicle local time generation and transmission processing, at step 100, the master ECU 11 first tries readout of the validity determination information 22 from the retention storage medium into the RAM or a register of the CPU. The register of the CPU is also an example of the volatile memory.

Subsequently, at step 103, the master ECU 11 determines whether the readout is successful or failed. On determination of successful result, the processing proceeds to step 120 successively. Alternatively, on determination of failed result, the processing proceeds to step 105 successively.

The failed result of the readout is caused when, for example, a temporary malfunction occurs due to glitch in the retention storage medium, interfering wave, or the like. Normally, the readout is successful.

In the case of the successful result, at step 120, it is determined whether the present state is immediately after the master ECU 11 returns from the reset state. When the master ECU 11 is reset, data stored in the RAM will be lost. Therefore, the determination whether the present state is immediately after the master ECU 11 returns from the reset state can be made, according to the contents in the RAM. Specifically, the determination can be made by determining whether, for example, the elapsed time information 21 is stored in the RAM. Alternatively, the determination can be made by determining whether the reset processing has been implemented.

In general, the master ECU 11 is reset in a case where, for example, the processing of the master ECU 11 goes into an infinite loop to cause a malfunction. Normally, it is determined that the present state is not immediately after returning from the reset state.

When it is determined that the present state is not immediately after returning from the reset state at step 120, the processing proceeds to step 140. At step 40, the master ECU 11 writes a value of the validity determination information 22, which was read from the non-volatile storage medium and stored in the RAM at step 100, in the retention storage medium. Thus, the processing proceeds to step 150. Alternatively, when it is determined that the present state is not immediately after returning from the reset state at step 120, the processing may proceed to step 145 as it is.

At step 145, it is determined whether the simultaneous storing request is received after executing step 145 at the last time before the present execution timing of step 145. It is noted that, in the case where it is the first execution of step 145 after the master ECU 11 is started, it is determined whether the simultaneous storing request is received after the master ECU 11 is started before the present execution timing of step 145. On determination that the simultaneous storing request is received, the processing proceeds to step 155 successively. Alternatively, on determination that the simultaneous storing request is not received, the processing proceeds to step 150 successively. As follows, the case where the processing proceeds to step 150 on determination that the simultaneous storing request is not received will be described. The processing on determination that the simultaneous storing request is received will be described later.

At step 150, it is determined whether a measured time of a timer housed in the control circuit reaches a predetermined reference time such as 1000 milliseconds in the present embodiment. On determination that the measured time does not reach the predetermined reference time, step 150 is executed again. Alternatively, on determination that the measured time reaches the predetermined reference time, the processing proceeds to step 160.

The start point of the measured time is the time point when the measured time has reached the reference time at step 150 at the last time. It is noted that, in the case where it has never been determined that the measured time has reached the reference time at step 150 after starting the processing in FIG. 3, the start point of the measured time is set at the time point at which step 150 is first executed after the start of the processing in FIG. 3. In this way, the processing proceeds from step 150 to step 160 each time when the reference time elapses.

At step 160 and subsequent steps, the value of the elapsed time information 21 in the RAM is changed by the time unit according to the elapse of the time in cycle order. "The change in the cycle order" is implemented such that the value of the 22-bit elapsed time information 21 is incremented by one from its minimum value to its maximum value, and the value of the elapsed time information 21 is returned to the minimum value after the value of the elapsed time information 21 reaches the maximum value. In the present embodiment, "the time unit according to the elapse of the time" is "one time unit by one second."

Specifically, the master ECU 11 increments the value of the elapsed time information 21 by one at step 160. It is noted that, in the case where the elapsed time information 21 is not stored in the RAM immediately after starting of the master ECU 11 or immediately after returning from the reset state, the elapsed time information 21 with the minimum value is stored in the RAM.

Subsequently, at step 170, it is determined whether the value of the elapsed time information 21 overflows. Specifically, when the elapsed time information 21 is at the maximum value and when the elapsed time information 21 is incremented by one, the value of the elapsed time information 21 overflows. On determination that the value of the elapsed time information 21 overflows, the elapsed time information 21 is set at the minimum value at step 180, and thereafter, the processing proceeds to step 190. On determination that the value of the elapsed time information 21 does not overflow at step 170, the processing skips step 180 and proceeds to step 190.

At step 190, data is generated as a simultaneous storing instruction. In the present embodiment, the simultaneous storing instruction is 8-bit data. It is noted that, the contents of the simultaneous storing instruction being generated presently is a predetermined value representing a failure value. The simultaneous storing instruction may be 8-bit data including eight bits all being set at "1." Dissimilarly to the simultaneous storing instruction generated at step 194 (described later), the present simultaneous storing instruction is not data for storing diagnostic information.

At subsequent step 192, the vehicle local time 20 is generated to include the elapsed time information 21, which has the value changed by the time unit according to the elapse of the time in the cycle order, as described above, and the latest value of the validity determination information 22 stored in the retention storage medium. Furthermore, the vehicle local time 20 and the simultaneous storing instruction generated at step 190 are included in one data frame. Furthermore, the data frame is caused to include a predetermined address ID for broadcasting, so that the data frame, which includes the vehicle local time 20 and the simultaneous storing instruction, is received by all the ECUs including the slave ECUs 12 to 14, other than the master ECU 11, connected to the in-vehicle LAN 15. Furthermore, an interface circuit is caused to send the data frame into the in-vehicle LAN 15. Subsequently, the processing returns to step S145. It is noted that, the transmission at step 192 is implemented only when the vehicle is in the IG-ON state. When the vehicle is in the IG-OFF state, the transmission is not implemented, and the processing returns to step 145.

In the exchange and record processing in FIG. 4 and FIG. 5, each of the slave ECUs 12 to 14 first waits for a predetermined time at step 210. Specifically, this predetermined time is, for example, 1000 milliseconds being same as a transmission interval at which the master ECU 11 transmits the vehicle local time 10. In the meantime, each of the slave ECUs 12 to 14 causes the communication interface circuit to receive the data frame, which includes the vehicle local time 20 and the simultaneous storing instruction, transmitted from the master ECU 11 through the in-vehicle LAN 15.

When the predetermined time elapses, the processing proceeds to step 220. At step 220, the vehicle local time 20 included in the received data frame is stored in the RAM and updated as the latest vehicle local time 20 in the slave ECU.

Subsequently, at step 230, it is determined whether a storing event occurs. The storing event is a predetermined event at which the diagnostic information needs to be stored.

The storing event is determined to occur in two cases. One of the two cases is when the simultaneous storing instruction in the data frame received at immediately preceding step 210 is not a failure value, that is, when the simultaneous storing instruction, which is not failure in value, is received at immediately preceding step 210.

The other one of the two cases is when a malfunction is determined to occur according to the detection signal from the sensor and when the malfunction is determined to necessitate storing of the diagnostic information on the self device. For example, the malfunction may occur when the engine revolution deviates from its predetermined normal range or when the brake pressure deviates from its predetermined normal range. It is specified beforehand a malfunction necessitating storing of the diagnostic information on the self device and a malfunction not necessitating storing of the diagnostic information on the self device.

In many cases, the storing event is determined not to occur. In this case, the processing proceeds to step 250 where it is determined whether transmission of the simultaneous storing request is needed. Transmission of the simultaneous storing request is determined to be needed when a malfunction is determined to occur according to the detection signal from the sensor and when the malfunction is determined to necessitate transmission of the simultaneous storing request. It is specified beforehand a malfunction necessitating transmission of the simultaneous storing request and a malfunction not necessitating transmission of the simultaneous storing request. In many cases, transmission of the simultaneous storing request is determined not to be needed. In this case, the processing returns to step 210.

As described above, in the IG-ON state when being communicable with the master ECU 11, each of the slave ECUs 12 to 14 receives the data frame, which includes the vehicle local time 20, from the master ECU 11 periodically (step 210) and synchronizes the inner time with the vehicle local time 20 (step 220). In addition, each of the slave ECUs 12 to 14 does not implement a processing to change the vehicle local time 20 by itself.

With the fundamental operation of the master ECU 11 and the slave ECUs 12 to 14 in this way, the vehicle local time 20 is sent from the master ECU 11 and received by the slave ECUs 12 to 14 repeatedly and periodically at the cycle of 1000 millisecond. As shown in the time period from the time t0 to the time t1 in the graph in FIG. 6, the elapsed time information 21 of the vehicle local time 20 increases by one relative to the elapse of one second at the constant increase rate in proportion to the elapse of the time.

Herein, it is assumed that the master ECU 11 is reset at the time t1 in the state where no slave ECUs 12 to 14 transmits the simultaneous storing request. In this case, the master ECU 11 stops its processing in the course of the vehicle local time generation and transmission processing in FIG. 3. Consequently, the elapsed time information 21 is lost from the RAM. Subsequently, the master ECU 11 returns from the reset state immediately and again begins the vehicle local time generation and transmission processing in FIG. 3.

In the present state, the readout of the validity determination information 22 is usually successful at step 100, it is determined that the readout is successful at subsequent step 103, and it is determined that the present state is immediately after returning from the reset state at subsequent step 120. Thus, the processing proceeds to step 125.

At step 125 and subsequent steps, the value of the validity determination information 22 is changed in the cycle order. "The change in the cycle order" is implemented such that the value of the 2-bit validity determination information 22 is incremented by one from its minimum value to its maximum value, and the value of the validity determination information 22 is returned to the minimum value after the value of the validity determination information 22 reaches the maximum value.

Specifically, at step 125, the validity determination information 22 readout at step 100 is incremented by one. Subsequently, at step 130, it is determined whether the validity determination information 22 overflows. Specifically, when the validity determination information 22 is at the maximum value and when the validity determination information 22 is incremented by one, the value of the validity determination information 22 overflows. On determination that the value of the validity determination information 22 overflows, the validity determination information 22 is set at the minimum value at step 130, and thereafter, the processing proceeds to step 140. On determination that the value of the validity determination information 22 does not overflow, the processing skips step 135 and proceeds to step 140.

At step 140, the validity determination information 22 after being changed and stored in the RAM is stored as the latest value of the validity determination information 22 in the retention storage medium. In this way, at the time t1 in FIG. 5, the value of the validity determination information 22 changed by one is updated as the latest value of the validity determination information 22 in the retention storage medium.

At step 145 subsequent to step 140, it is determined that the simultaneous storing request is not received. Subsequently, the processing proceeds to step 150 at which the processing waits until the measured time reaches 1000 milliseconds. At step 160, the elapsed time information 21 is not stored in the RAM, since it is immediately after the master ECU 11 returns form the reset state. Therefore, the value of the elapsed time information 21 at its minimum value (namely, initial value) is newly stored in the RAM. Subsequently, at step 170, it is determined that the value of the elapsed time information 21 does not overflow. At step 190, the simultaneous storing request, which includes the failure value, is generated. At step 192, the vehicle local time 20, which includes the elapsed time information 21 being set in the above-described way and the validity determination information 22, and the simultaneous storing request are included into one data frame. Thus, the data frame is transmitted.

Figure 6:
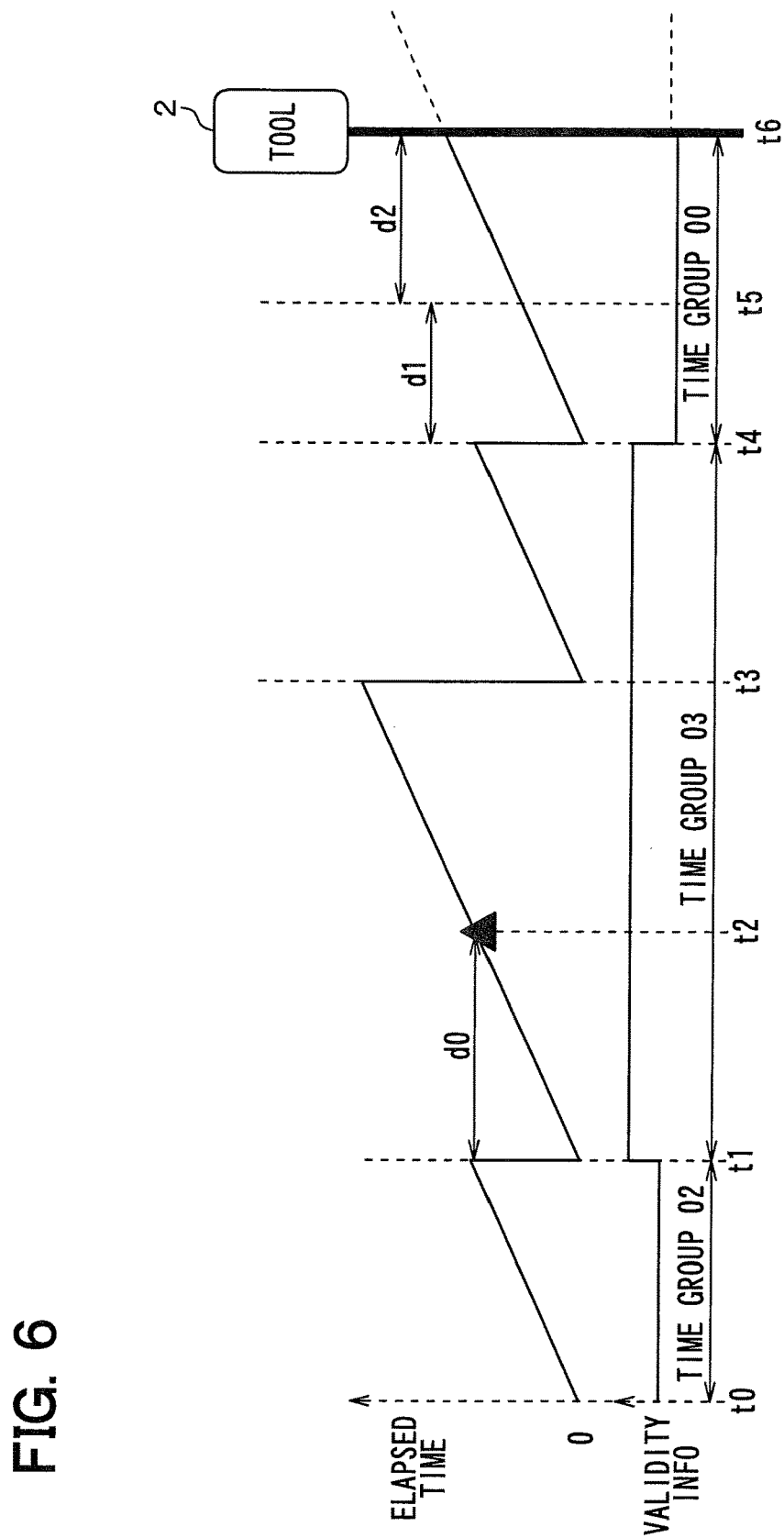
FIG. 6 is a graph showing transition of elapsed time information and validity determination information with elapse of the time.

Subsequent to the time t1, the master ECU 11 and the slave ECUs 12 to 14 implement the above-described fundamental operation. Thus, as shown in FIG. 6, the elapsed time information 21 increases with the elapse of the time, while the validity determination information 22 is constant in the ECUs 11 to 14.

Figure 3:
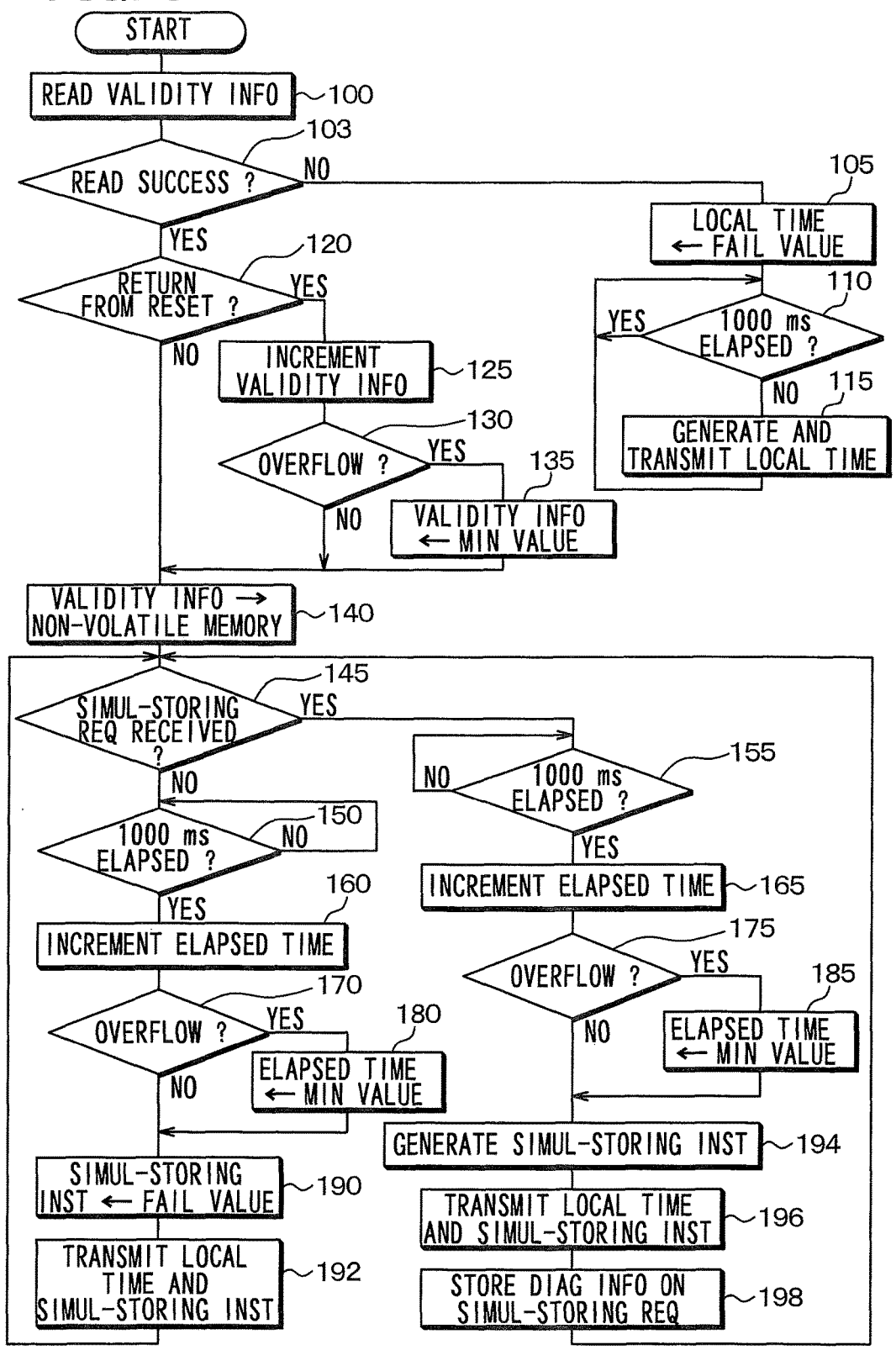
FIG. 3 is a flowchart showing a vehicle local time generation and transmission processing implemented by a master ECU.

It is noted that, even in the case where the vehicle is in the IG-OFF state to disable communications through the in-vehicle LAN 15, the master ECU 11 is in operation to implement the processing in FIG. 3. Thus, the master ECU 11 continues the change in the value of the elapsed time information 21 by the time unit according to the elapse of the time (steps 160 to 180). In addition, the master ECU 11 continues the change in the value of the validity determination information 22 according to occurrence of reset (steps 120 to 140). Therefore, the vehicle local time 20 changes with the elapse of the time in the same form when the vehicle is in the IG-ON state. In the following description, a series time period, in which the validity determination information 22 is constant to have the same value, is referred to as a time group.

Herein, it is assumed that the storing event occurs in the slave ECU 12 at the time t2. Specifically, it is assumed that, at step 230, the slave ECU 12 determines that the engine coolant temperature exceeds its allowable range according to the detection signal from the engine coolant temperature sensor and determines that a malfunction occurs. In addition, it is assumed that the slave ECU 12 determines that the malfunction necessitates storing of the diagnostic information by the self device. In this case, the slave ECU 12 determines that the storing event occurs, and the processing proceeds to step 240.

In this case, the diagnostic information on the self device is generated at step 240. Further, the diagnostic information is associated with the latest vehicle local time 20 stored in the RAM, and the associated information is stored in the retention storage medium. In the vehicle local time 20 stored with the diagnostic information presently, the value of the elapsed time information 21 corresponds to the elapsed time d0 in FIG. 6, and the value of the validity determination information 22 is 03.

The diagnostic information stored presently includes a diagnosis trouble code (DTC) and a freeze frame data (FFD). The DTC is a malfunction classification code representing the classification of the malfunction related to the high temperature of engine cooling water. The FFD may include data related to, for example, the detected engine coolant temperature.

Subsequent to step 240, the proceeds to step 250, at which it is determined whether the simultaneous storing request is needed. In the present example, it is assumed that the detected malfunction does not need transmission of the simultaneous storing request. In this case, the processing returns to step S210.

Subsequent to the time t2, the master ECU 11 and the slave ECUs 12 to 14 implement the above-described fundamental operation. Thus, the elapsed time information 21 increases with the elapse of the time, while the validity determination information 22 is constant in the ECUs 11 to 14.

Subsequently, at the time t3, it is assumed that the elapsed time information 21 reaches the maximum value, and after the elapse of 1000 milliseconds, it is assumed that overflow occurs at step 160 in the vehicle local time generation and transmission processing in FIG. 3. In this case, the master ECU 11 determines that the overflow occurs at step 170. Subsequently, the processing proceeds to step 180 at which the elapsed time information 21 is set at the minimum value. In this case, the elapsed time information 21 does not change.

In consideration of that the elapsed time information 21 is the 22-bit length date, and its LSB is equivalent to 1 second, the length of the time period from the time t1, at which the elapsed time information 21 changes from the minimum value to the maximum value, to the time t3, is about 48.5 days.

Subsequent to the time t3, the master ECU 11 and the slave ECUs 12 to 14 implement the above-described fundamental operation. Thus, the elapsed time information 21 increases from the minimum value with the elapse of the time, while the validity determination information 22 is constant in the ECUs 11 to 14.

Thereafter, it is assumed that the master ECU 11 is reset at the time t4. In this case, the master ECU 11 proceeds the processing to step 125 similarly to the case at the time t1, and increments the value of the validity determination information 22, which is readout at step 100, by one. The value of the validity determination information 22 before the present increment is the maximum value (03). Therefore, the validity determination information 22 overflows by the present increment. In response to this, at step 130, the master ECU 11 determines that the value of the validity determination information 22 overflows. Thus, the processing proceeds to step 130, at which the value of the validity determination information 22 is set to the minimum value (00), and the processing proceeds to step 140. The processing subsequent to step 140 is similar to those in the case of the time t1.

Subsequent to the time t4, the master ECU 11 and the slave ECUs 12 to 14 implement the above-described fundamental operation. Thus, the elapsed time information 21 increases from the minimum value with the elapse of the time, while the validity determination information 22 is constant in the ECUs 11 to 14.

Figure 7:
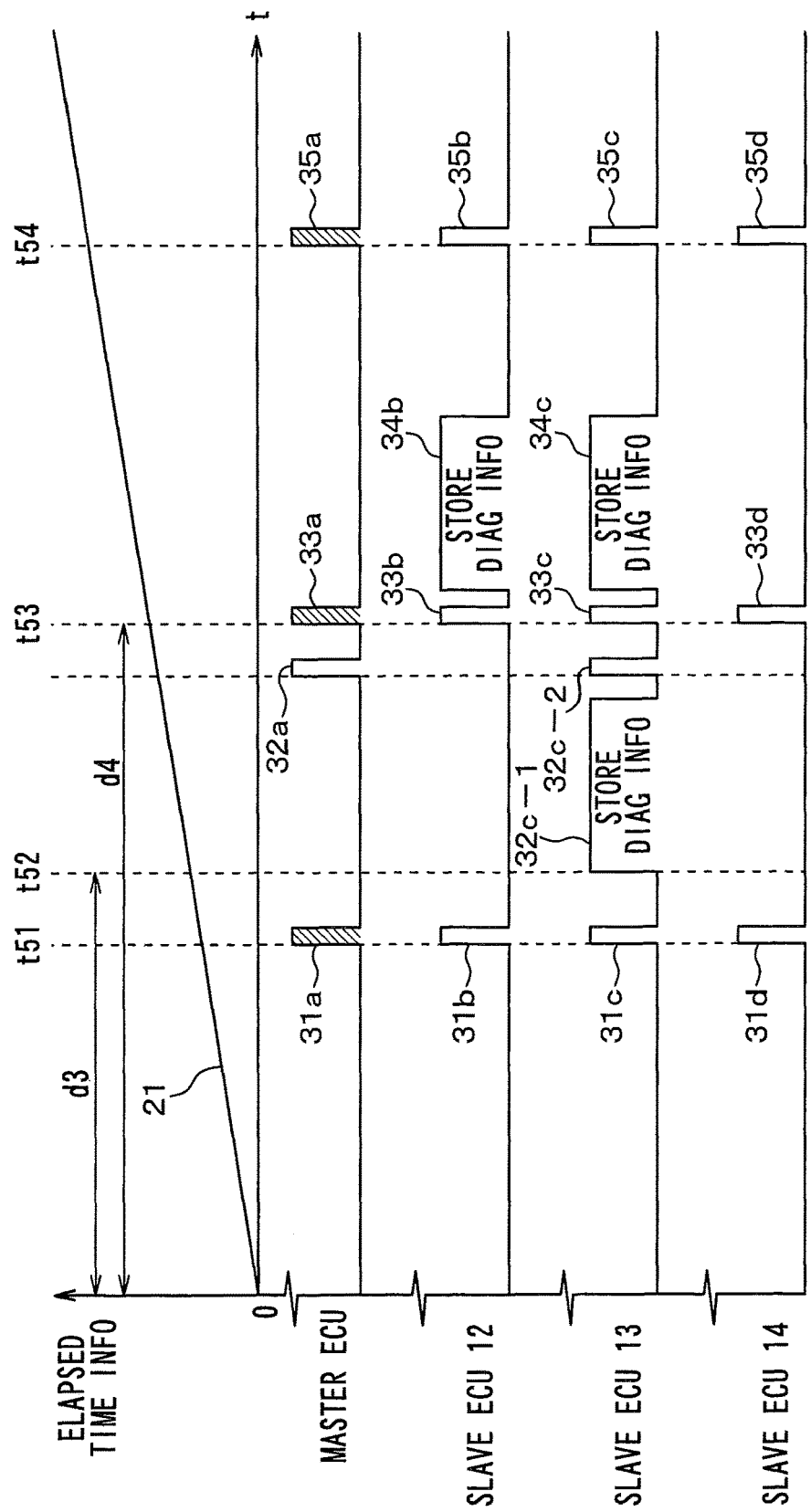
FIG. 7 is a timing chart showing operation of ECUs.

Thereafter, it is assumed that the engine revolution exceeds its allowable range in the time zone t5. FIG. 7 shows the operation of the ECUs 11 to 14 and the transition of the elapsed time information 21 with the elapse of the time in the time zone t5 from the time t51 to the time t54.

At the time t51, with the above-described fundamental operation of the master ECU 11 and the slave ECUs 12 to 14, the master ECU 11 implements the vehicle local time generation and the transmission processing in FIG. 3 and transmits the vehicle local time 20 (31a). Further, the slave ECUs 12 to 14 implements the processing at step 210 in FIG. 4 and receives the vehicle local time 20 (31b to 31d).

At the time t52 subsequent to the time t51, the slave ECU 13 detects that the engine revolution exceeds the allowable range at step 230 in FIG. 4. It is assumed that the malfunction that the engine revolution exceeds the allowable range is specified beforehand in the slave ECU 13 to necessitate storing of the diagnostic information by the self device and to necessitate transmission of the simultaneous storing request. Therefore, at the time t52, the slave ECU 13 determines, at step 230, that the engine revolution exceeds its allowable range according to the detection signal from the engine revolution sensor and determines that the malfunction occurs. In addition, when the slave ECU 13 determines that the malfunction necessitates storing of the diagnostic information by the self device, the processing proceeds to step 240.

In this case, the diagnostic information on the self device is generated at step 240. Further, the diagnostic information is associated with the latest vehicle local time 20 stored in the RAM, and the associated information is stored in the retention storage medium (32c-1). In the vehicle local time 20 stored with the diagnostic information presently, the value of the elapsed time information 21 corresponds to the elapsed time d3 in FIG. 7, and the value of the validity determination information 22 is 00. The diagnostic information stored presently includes the DTC and the FFD. The DTC and the FFD to be stored are determined correspondingly to a malfunction.

At step 250 subsequent to step 240, the malfunction is determined to occur according to the detection signal from the sensor, and the malfunction is determined to necessitate transmission of the simultaneous storing request. Consequently, it is determined that the transmission of the simultaneous storing request is necessitated, and the processing proceeds to step 260 in FIG. 5 successively.

At step 260, it is determined whether the vehicle local time 20 is normally received from the master ECU at immediately preceding step 210. In usual cases, it is determined that the vehicle local time 20 is normally received from the master ECU. To the contrary, when it is determined that the vehicle local time 20 is not normally received due to a malfunction, the processing is returned to step 210 and the processing waits for reception of the subsequent vehicle local time 20.

When it is determined that the vehicle local time 20 is normally received, the processing proceeds to step 270 at which a system identification code and a malfunction classification code are generated. The system identification code and the malfunction classification code are to be included in the simultaneous storing request transmitted to the master ECU 11. The system identification code and the malfunction classification code are determined according to the classification of the malfunction detected at step 250.

Specifically, the system identification code is, for example, a 4-bit code for specifying the classification of an ECU relevant to the detected malfunction. The correspondence between the occurring malfunction and the system identification code is beforehand specified uniformly in each of the ECUs 11 to 14. For example, the value of the system identification code associated with each malfunction may be three values respectively representing three kinds of malfunctions in the power train system, three values respectively representing three kinds of malfunctions in the brake mechanism system, and/or three values respectively representing three kinds of malfunctions in the safety device system. Alternatively or in addition, the value of the system identification code associated with each malfunction may be three values respectively representing three kinds of malfunctions in the convenience and comfortable control device system and/or three values respectively representing three kinds of malfunctions of all the ECU systems. In the present embodiment, it is assumed that the malfunction that the engine revolution exceeds the allowable range is assigned to one of the values of the power train system. Therefore, at present step 270, the system identification code representing the one value of the power train system is generated.

The malfunction classification code is, for example, a 4-bit code for specifying the detected malfunction uniquely. Determination of the combination of the occurring malfunction, the system identification code, and the malfunction classification code enables identification of the category of the malfunction uniquely. The correspondence between the category of malfunction and the malfunction classification code is beforehand specified uniformly in each of the ECUs 11 to 14.

Figure 8:
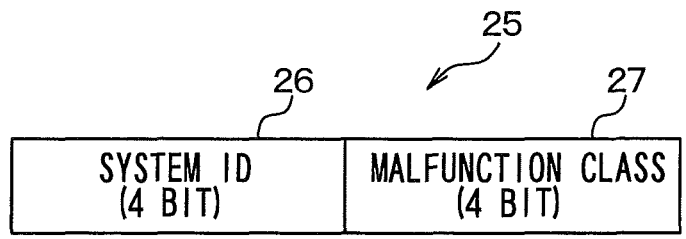
FIG. 8 is a view showing the contents of a simultaneous storing request.

Subsequently, at step 280, the simultaneous storing request is generated. As shown in FIG. 8, a simultaneous storing request 25 includes a system identification code 26 generated at immediately preceding step 270 and a malfunction classification code 27.

At subsequent step 290, the simultaneous storing request 25 generated at immediately preceding step 280 is transmitted to the master ECU 11 through the in-vehicle LAN 15 (32c-2 in FIG. 7). The master ECU 11 receives the simultaneous storing request 25 (32a).

Subsequently, at step 145 in FIG. 3, the master ECU 11 determines that the simultaneous storing request 25 is received, and the processing proceeds to step 155. At step 155, similarly to step 150, it is determined whether the measured time of the timer reaches the predetermined reference time such as 1000 milliseconds. On determination that the measured time does not reach the predetermined reference time, step 155 is executed again. On determination that the measured time reaches the predetermined reference time at the time t53, the processing proceeds to step 165.

The processings at steps 165, 175, 185 are equivalent to the processings at steps 160, 170, 180, respectively. Therefore, at each of steps 165, 175, 185, the value of the elapsed time information 21 in the RAM is changed by the time unit (e.g., 1000 milliseconds) according to the elapse of the time in the cycle order.

At step 194 subsequent to steps 165, 175, 185, the simultaneous storing instruction is generated. Specifically, the contents of the simultaneous storing instruction is modified to include the system identification code 26 in the simultaneous storing request 25 determined to be received at immediately preceding step 145 and the malfunction classification code 27. The system identification code 26 other than the failure value is employed as the simultaneous storing instruction in this way, and thereby, the simultaneous storing instruction functions as data for storing the diagnostic information.

At subsequent step 196, the elapsed time information 21 changed by the time unit according to the elapse of the time in the cycle order value is generated in the manner as described above. In addition, the vehicle local time 20 including the latest value of the validity determination information 22 stored in the retention storage medium is further generated. Furthermore, the vehicle local time 20 and the simultaneous storing instruction generated at step 196 are included in one data frame. In addition, the predetermined address ID for broadcasting is included in the data frame, so that the data frame, which includes the vehicle local time 20 and the simultaneous storing instruction, are sent to all the ECUs including the slave ECUs 12 to 14, which are other than the master ECU 11, connected to the in-vehicle LAN 15. Furthermore, the interface circuit is caused to send the data frame into the in-vehicle LAN 15 (33a in FIG. 7).

At subsequent step 198, the diagnostic information is generated according to the simultaneous storing request 25 determined to be received at immediately preceding step 145. Further, the diagnostic information is associated with the latest vehicle local time 20 stored in the RAM, and the associated information is stored in the retention storage medium. The associated information is stored at the time 33a in FIG. 7.

In the vehicle local time 20 stored with the diagnostic information presently, the value of the elapsed time information 21 corresponds to the elapsed time d4 in FIG. 7, and the value of the validity determination information 22 is 00. The diagnostic information of the self device stored presently includes the DTC and the FFD. It is noted that, the DTC is a value same as the malfunction classification code 27 included in the simultaneous storing request 25 determined to be received at immediately preceding step 145. The contents of the FFD included in the diagnostic information are determined according to the system identification code 26 in the simultaneous storing request 25. The correspondence between the system identification code 26 and the contents of FFD is specified beforehand.

It is noted that, when the master ECU 11 is for the power train system, the master ECU 11 may store the diagnostic information in the retention storage medium at step 198, since the system identification code is the power train system. Alternatively, when the master ECU 11 is not for the power train system, the master ECU 11 may not store the diagnostic information in the retention storage medium at step 198, since the system identification code is the power train system.

In this way, each of the slave ECUs 12 to 14 receives the data frame (33b to 33d in FIG. 7) transmitted from the master ECU 11 (33a) at step 210 in FIG. 4 through the communication interface unit. At subsequent step 220, each of the slave ECUs 12 to 14 stores, as the latest vehicle local time 20, the vehicle local time 20 in the data frame in the RAM of the slave ECU thereby to update the vehicle local time 20.

Furthermore, at step 230, the storing event is determined to occur, on determination that the simultaneous storing instruction in the data frame received at immediately preceding step 210 is not the failure value. Thus, the processing proceeds to step 240.

In this case, the diagnostic information is generated at step 240. Further, the diagnostic information is associated with the latest vehicle local time 20 stored in the RAM, and the associated information is stored in the retention storage medium. In the vehicle local time 20 stored with the diagnostic information presently, the value of the elapsed time information 21 corresponds to the elapsed time d4 in FIG. 7, and the value of the validity determination information 22 is 00.

The diagnostic information stored presently includes the DTC and the FFD. It is noted that, the DTC is a value same as the malfunction classification code 27 included in the simultaneous storing instruction received at immediately preceding step 210. The contents of the FFD included in the diagnostic information are determined according to the system identification code 26 in the simultaneous storing request 25. The correspondence between the system identification code 26 and the contents of FFD is specified beforehand.

It is noted that, the FFD in the diagnostic information stored at the time t52 by the slave ECU 13, which is the sender of the simultaneous storing request, may be the same as or may be distinct from the FFD in the diagnostic information stored by the slave ECU 13 presently.

It is determined whether to store the diagnostic information at step 240 according to the system identification code 26 included in the simultaneous storing instruction received at immediately preceding step 210. Specifically, in each of the slave ECUs 12 to 14, it is prescribed that the system identification code 26 belonging to a specific category and included in the simultaneous storing instruction causes the storing of the diagnostic information at step 240 when being received and the system identification code 26 belonging to the other category and included in the simultaneous storing instruction does not cause the storing of the diagnostic information at step 240 when being received.

More specifically, the slave ECUs 12 and 13 for controlling the power train system store the diagnostic information at step 240, only when receiving the simultaneous storing instruction including the system identification code at a value representing the power train system or when receiving the simultaneous storing instruction including the system identification code at a value representing all the ECUs. Alternatively, the slave ECUs 12 and 13 for controlling the power train system do not store the diagnostic information at step 240 when receiving the simultaneous storing instruction including the system identification code at a value other than the value representing the power train system or all the ECUs.

More specifically, the slave ECU 14 for controlling the convenience and comfortable control device system stores the diagnostic information at step 240, only when receiving the simultaneous storing instruction including the system identification code at a value representing the convenience and comfortable control device system or when receiving the simultaneous storing instruction including the system identification code at a value representing all the ECUs. Alternatively, the slave ECU 14 for controlling the convenience and comfortable control device system does not store the diagnostic information at step 240 when receiving the simultaneous storing instruction including the system identification code at a value other than the value representing the convenience and comfortable control device system or all the ECUs.

In present example, the simultaneous storing request received by the slave ECUs 12 to 14 includes the system identification code at the value representing the power train system. Therefore, the slave ECUs 12 and 13 store the diagnostic information (34b, 34c in FIG. 7) at step 240, and the slave ECU 14 does not store the diagnostic information at step 240.

Figure 9:
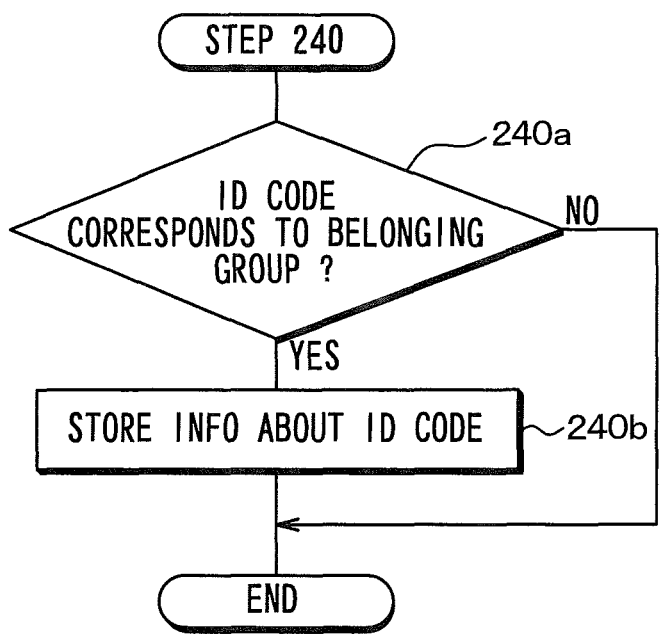
FIG. 9 is a flow chart showing a part of the exchange and record processing in FIG. 4.

As follows, the processing of each of the slave ECUs 12 to 14 at step 240 will be described further in detail. The processing proceeds to step 240 on determination that the storing event occurs at step 230 on reception of the simultaneous storing instruction, which is not at the failure value. In this case, at step 240, each of the slave ECUs 12 to 14 implements the processing shown in FIG. 9.

Specifically, at step 240a, the system identification code included in the simultaneous storing instruction is first compared with a code included in a belonging group list stored in the self device. Thus, it is determined whether any one of the codes included in the belonging group list is the same as the system identification code. On determination that the any one of the codes included in the belonging group list is the same as the system identification code, the processing proceeds to step 240b, at which the diagnostic information and the latest vehicle local time 20 are stored in the retention storage medium. Alternatively, on determination that none of the codes included in the belonging group list is the same as the system identification code being received, the processing skips step 240b to proceed to step 250. Thus, the processing at step 240 is terminated.

As follows, the belonging group list will be described. In each of the slave ECUs 12, 13, 14, the belonging group list of the self device is beforehand stored in the retention storage medium or ROM of the self device. The belonging group list stored in each of the slave ECUs 12, 13, 14 includes the system identification code corresponding to the group to which the slave ECU belongs. The "group" denotes a group configured with the ECUs as components. Therefore, the ECU(s) for controlling a device of the body system belongs to a group of the body system, the ECU(s) for controlling the power train belongs to a group of the power train system, and the ECU(s) for controlling wireless communication belongs to a group for a wireless system. Furthermore, the ECU(s) for controlling illumination of the vehicle belongs to a group of an illuminations system, and the ECU(s) for controlling the electric power source of the vehicle belongs to a group of an electric power control system.

Figure 10:
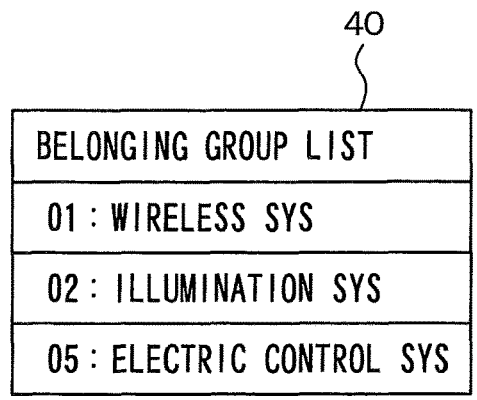
FIG. 10 is a view showing one example of a belonging group list.

In the example shown in FIG. 10, the belonging group list 40 includes, for example, a system identification code corresponding to the group of the wireless system, a system identification code corresponding to the group of the illumination system, and a system identification code corresponding to the group of an electric power control system. With the present configuration, it is recognized that the slave ECU storing the belonging group list belongs to the group of the wireless system, the group of the illumination system, and the group of the electric power control system.

In this way, each of the slave ECUs 12 to 14 stores the diagnostic information on the self device when the system identification code included in the storing instruction sent from the master ECU 11 corresponds to the group to which the self device belongs. Alternatively, each of the slave ECUs 12 to 14 does not store the diagnostic information on the self device when the system identification code included in the storing instruction sent from the master ECU 11 does not correspond to the group to which the self device belongs. With the present configuration, information useful for analysis of the malfunction can be selectively stored, thereby to restrain a resource for storing the diagnostic information.

As described above, the contents of the FFD including the diagnostic information stored at step 240b are determined according to the system identification code 26 in the simultaneous storing request 25. In addition, the correspondence between the system identification code 26 and the contents of the FFD is specified beforehand.

Specifically, the retention storage medium or the ROM of each of the slave ECUs 12, 13, 14 includes the above-described belonging group list and stores the stored data correspondence table.

The stored data correspondence table stored in each of the slave ECUs 12, 13, 14 includes the system identification codes, which are included in the belonging group list stored in the same slave ECU, each being associated correspondingly with an input-and-output data name. Each of the input-and-output data in a certain ECU is data in the certain ECU retrieved from a sensor or another ECU, data in the certain ECU outputted to control an actuator, or data transmitted to the certain ECU.

Figure 11:
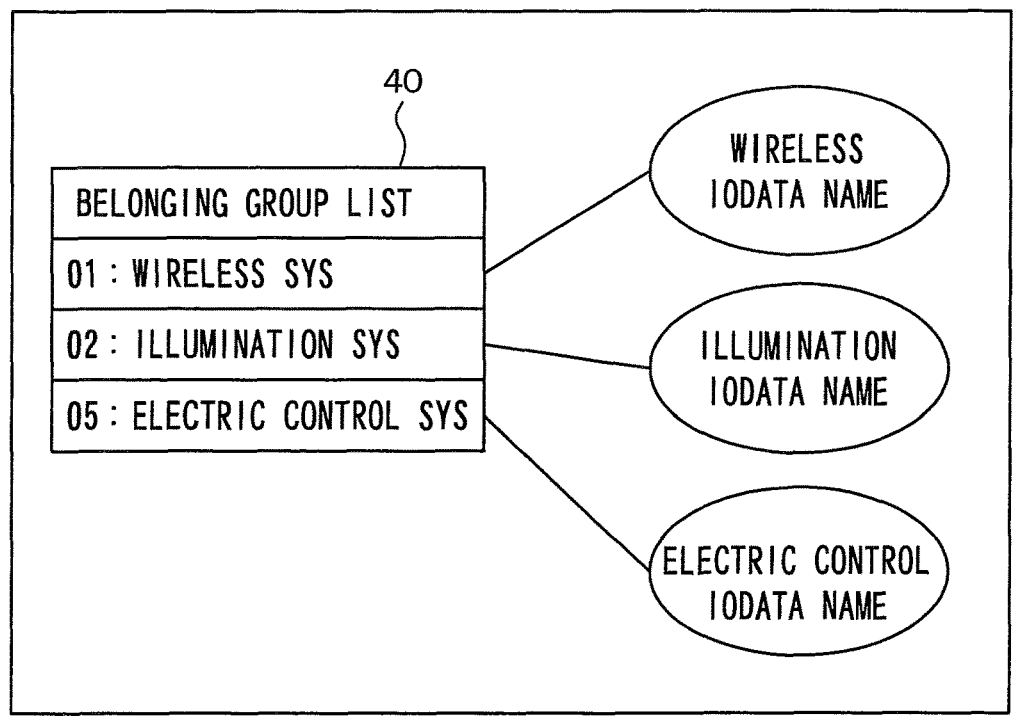
FIG. 11 is a view showing an example of a data configuration of a stored data correspondence table.

FIG. 11 shows an example of the belonging group list. In the example, it is assumed that the belonging group list included in a certain slave ECU, which may be any one of the slave ECUs 12, 13, 14, includes a system identification code 01, a system identification code 03, and a system identification code 05. The system identification code 01 corresponds to the group of the wireless system. The system identification code 03 corresponds to the group of the illumination system. The system identification code 05 corresponds to the group of the electric power control system. In this case, the stored data correspondence table includes information on names of the wireless-related input-and-output data corresponding to the system identification code 01, names of the illumination-related input-and-output data corresponding to the system identification code 03, and names of the power-control-system-related input-and-output data corresponding to the system identification code 05. The names of the wireless-related input-and-output data corresponding to the system identification code 01 include, for example, the classification of a manual operation button of a wireless key device, the state of a door lock position SW, the state of a door courtesy SW, and/or the like. The names of the illumination-related input-and-output data corresponding to the system identification code 03 include, for example, the state of an illumination SW, an illumination lighting time, an illumination lighting instruction request from each ECU, and/or the like. The names of the power-control-system-related input-and-output data corresponding to the system identification code 05 include, for example, the state of an ignition switch (IGSW), the state of an airconditioner switch (ACCSW), the state of a brake SW, and/or the like.

At step 240b, each of the slave ECUs 12 to 14 reads the input-and-output data name, which is associated with the system identification code in the simultaneous storing request being received, from the stored data correspondence table of the self device. In addition, each of the slave ECUs 12 to 14 sets the data of the readout input-and-output data name as the FFD. Further, each of the slave ECUs 12 to 14 associates the diagnostic information and an operation history including the FFD and DTC with the latest vehicle local time 20 and store the associated information.

In the example shown in FIG. 11, in the case where, for example, the system identification code 01 of the wireless system is included in the simultaneous storing request being received, the data of the wireless-related input-and-output data name is stored as the FFD in the storage medium, with reference to the stored data correspondence table.

In this way, the slave ECUs 12 to 14 selectively stores in the storage medium only the input-and-output data in the group corresponding to the system identification code, among all the input-and-output data sent from and received by the self device. At step 240b, the latest vehicle local time 20 is certainly stored with the diagnostic information, irrespectively of the system identification code in the simultaneous storing request being received.

With the present configuration, when the slave ECU 12 of the self device belongs to the group relevant to an malfunction occurring in a certain slave ECU, the diagnostic information is stored by the self device. Alternatively, when the slave ECU of the self device does not belong to the group, the diagnostic information is not stored by the self device. Therefore, information useful for analysis of the malfunction can be selectively stored, and the resource for storing the diagnostic information can be restrained.

At step 250 subsequent to step 240, the malfunction is not detected in the self device. Therefore, it is determined that transmission of the simultaneous storing request is not needed, and the processing returns to step 210.

Subsequently, at the time t54, with the above-described fundamental operation of the master ECU 11 and the slave ECUs 12 to 14, the master ECU 11 implements the vehicle local time generation and the transmission processing in FIG. 3 and transmits the vehicle local time 20 (35a). Further, the slave ECUs 12 to 14 implements the processing at step 210 in FIG. 4 and receives the vehicle local time 20 (35b to 35d).

Subsequent to the time t5, the master ECU 11 and the slave ECUs 12 to 14 implement the above-described fundamental operation. Thus, the elapsed time information 21 increases with the elapse of the time, while the validity determination information 22 is constant in the ECUs 11 to 14.

Herein, subsequent to the time t5, it is assumed that the vehicle is carried into, for example, a repair shop, before the elapsed time information 21 becomes the maximum value. In most cases, the IG device of the vehicle is once turned OFF and turned ON in the time period after the diagnostic information is stored at the time t5 before the vehicle is carried into the repair shop. Nevertheless, as described above, the change in the value of the elapsed time information 21 is continued by the time unit according to the elapse of the time, even after the IG device is turned ON and OFF.

Subsequently, it is assumed that, at the time t6 in the state where the IG is turned ON, the diagnostic tool 2 is connected to the vehicular system 1 through the in-vehicle LAN 15 in, for example, the repair shop. Furthermore, it is assumed that a user of the diagnostic tool 2 implements a predetermined operation on an operation device for reading the diagnostic information on a specific slave ECU. In the present example, the specific slave ECU is, for example, the slave ECU 13. The diagnostic tool 2 may implement either wired communications or wireless communications with the vehicular system 1. Thus, the diagnostic tool 2 causes the interface circuit to transmit a readout command to the master ECU 11 and the slave ECUs 12 and 13 through the in-vehicle LAN 15.

On receiving the readout command through the interface circuit of the self device, each of the master ECU 11 and the slave ECUs 12 and 13 reads the latest vehicle local time 20, which is stored in the RAM of the control circuit of the self device, and the vehicle local time 20, which is associated with the diagnostic information and stored in the retention storage medium of the self device. Further, each of the master ECU 11 and the slave ECUs 12 and 13 causes the interface circuit of the self device to transmit the latest vehicle local time 20, the diagnostic information, and the vehicle local time 20 (storing-time vehicle local time 20), which is associated with the diagnostic information, to the diagnostic tool 2 through the in-vehicle LAN 15.

The diagnostic tool 2 receives the data transmitted from the master ECU 11 and the slave ECUs 12 and 13 through the interface circuit of the self device in this way. The diagnostic tool 2 further determines whether the value of the validity determination information 22 in the latest vehicle local time 20 is the same as the value of the validity determination information 22 in the storing-time vehicle local time 20. On determination that the values of the validity determination information 22 are the same, the diagnostic tool 2 calculates a retroactive time, which is equivalent to the difference between the value of the elapsed time information 21 in the latest vehicle local time 20 and the value of the elapsed time information 21 in the storing-time vehicle local time 20 (see FIG. 5).

For example, it is assumed a case where the value of the elapsed time information 21 in the latest vehicle local time 20 is 2FFFF in the hexadecimal number notation, and the value of the elapsed time information 21 in the storing-time vehicle local time 20 is 2AFFF in the hexadecimal number notation. In this case, the retroactive time corresponding to the difference therebetween is 20480 seconds (about 5 hours and a half).

In addition, the present absolute time is retrieved from the time counter device, and an absolute time, at which the diagnostic information was stored, is calculated by subtracting the retroactive time from the retrieved present absolute time. Thus, the display device is caused to indicate the calculated absolute time at which the diagnostic information was stored. In this case, the display device is also caused to indicate the diagnostic information.

When the value of the validity determination information 22 in the latest vehicle local time 20 is not the same as the value of the validity determination information 22 in the storing-time vehicle local time 20, the absolute time, at which the diagnostic information was stored, is unclear. Therefore, in such a case, the diagnostic tool 2 causes the display device to indicate the storing-time vehicle local time 20, as it is. In this case, the display device is also caused to indicate the diagnostic information.

As described above, the master ECU 11 changes the value of the elapsed time information 21, which is included in the vehicle local time 20 to be transmitted to the slave ECUs 12 to 14, by the time unit according to the elapse of the time. In addition, the master ECU 11 continues the change in the value of the elapsed time information 21 by the time unit according to the elapse of the time, even when the main power source (IG switch) of the vehicle is turned ON or turned OFF.

Realistically, a case is conceivable where a user turns the IG device OFF and ON, after the diagnostic information and the elapsed time was stored in the slave ECUs 12 to 14, before the vehicle is actually carried into the repair shop, for example, and diagnosed with the diagnostic tool. Even in such a case, the present configuration enables to reduce possibility of occurrence of a situation where the absolute time, at which the malfunction has occurred, is unclear, since the elapsed time has been reset due to the turning ON and OFF of the IG device. That is, the absolute time, at which the event occurs, can be specified with higher possibility than that of a conventional configuration.

Realistically, a user of the vehicle may inquire about a trouble caused at a specific time (e.g., about 17:30, January 13). In such a case, the present configuration enables to retrieve the absolute time, at which the diagnostic information related to the trouble was stored, together with the diagnostic information by using the diagnostic tool 2. Therefore, the cause of the trouble can be easily and appropriately specified in response to such an inquiry of the user.

It is noted that, when the master ECU 11 returns from the reset state, it is unclear the time period, in which the master ECU 11 had been out of operation. Therefore, the recent value of the elapsed time information 21, when the master ECU 11 was previously in operation, does not represent appropriate progress in time. In consideration of this, the elapsed time information is set to the minimum immediately after the return from the reset state. In addition, in response to the return from the reset state, the master ECU 11 newly stores the elapsed time information 21 at its initial value in the volatile storage medium. Thereby, the elapsed time information 21 is enabled to represent the correct elapsed time from the time point of the return from the reset state.

Furthermore, the master ECU 11 stores a valid value of the validity determination information 22 in the retention storage medium, separately from the elapsed time information 21. The retention storage medium retains the stored content even when the master ECU 11 is reset. In addition, the master ECU 11 changes the valid value of the validity determination information 22 stored in retention storage medium (e.g., volatile storage medium) in response to return of the master ECU 11 from the reset state. Furthermore, the master ECU 11 generates the vehicle local time 20 including the validity determination information 22 in addition to the elapsed time information 21 and repeatedly transmits the vehicle local time 20 to the slave ECUs 12 to 14.

With the present configuration, the valid value of the validity determination information 22, the elapsed time information 21, and the diagnostic information are stored in the storage medium in the slave ECUs 12 to 14. Therefore, the diagnostic information, which is stored before the return of the master ECU 11 from the reset state, is distinguishable from the diagnostic information, which is stored subsequent to the return of the master ECU 11 from the reset state.

In the vehicle local time generation and transmission processing in FIG. 3 implemented by the master ECU 11, the processing proceeds to step 105 on determination that the readout is unsuccessful at step 103. At step 105, the vehicle local time 20 is set at the predetermined failure value. For example, the predetermined failure value represents the vehicle local time 20 being at the maximum value (03h) and the elapsed time information 21 being at the maximum value (3FFFFEh). At step 110 subsequent to step 105, the vehicle local time 20 at the failure value is transmitted to the slave ECUs 12 to 14 (110, 115) repeatedly at a constant cycle, such as 1000 ms.

As described above, in the vehicular system 1 of the present disclosure, the slave ECU 13 (or other slave ECUs 12 and 14) transmits the simultaneous storing request to the master ECU 11, on detection of a malfunction. The master ECU 11 transmits the simultaneous storing instruction for causing the diagnostic information to be stored, on reception of the simultaneous storing request. The slave ECUs 12 and 13 generates the diagnostic information on the self device and stores the generated diagnostic information in the retention storage medium, on reception of the simultaneous storing instruction transmitted from the master ECU 11.

With the present configuration, even when the slave ECU 13 detects a malfunction, the diagnostic information is generated and stored in the ECUs, such as the master ECU 11 and the slave ECU 12, other than the slave ECU 13.

In addition, the slave ECU 13 includes the malfunction classification code, which represents the classification of the malfunction, in the simultaneous storing request to be transmitted to the master ECU 11. The master ECU 11 includes the malfunction classification code, which is included in the simultaneous storing request received from the slave ECU 13, in the simultaneous storing instruction to be transmitted. The slave ECUs 12 and 13 include the malfunction classification code, which is included in the simultaneous storing instruction received from the master ECU 11, in the diagnostic information on the self device.

The present configuration enables easily to specify the classification of the malfunction, which is detected by the other ECU 13, causing the slave ECU 12 to store the diagnostic information.

In addition, the slave ECU 13 includes the predetermined system identification code in the simultaneous storing request to be transmitted to the master ECU 11. The master ECU 11 includes the system identification code, which is included in the simultaneous storing request received from the slave ECU 13, in the simultaneous storing instruction to be transmitted. The slave ECUs 12, 13, 14 determines whether to store the diagnostic information in the slave ECU 12, according to the system identification code included in the simultaneous storing instruction received from the master ECU 11.

With the present configuration, the slave ECU 13 is enabled to control whether to cause the other slave ECUs 12 and 13 to generate and store the diagnostic information by using the system identification code.

It is conceivable that the master ECU 11 changes the value of the elapsed time information 21 by the time unit according to the elapse of the time. In this case, the master ECU 11 generates the vehicle local time 20 including the elapsed time information 21 and transmits the generated vehicle local time 20 with the simultaneous storing instruction to the slave ECU 12. In this case, on reception of the vehicle local time 20 and the simultaneous storing instruction from the master ECU 11, the slave ECU 12 associates the diagnostic information on the slave ECU 12 with the vehicle local time 20 to each other and stores the associated diagnostic information and the vehicle local time 20 in the retention storage medium. In this case, on reception of the vehicle local time 20 and the storing instruction from the master ECU 11, the slave ECU 14 associates the diagnostic information on the slave ECU 14 with the vehicle local time 20 to each other and store the associated diagnostic information and the vehicle local time 20 in the retention storage medium.

With the present configuration, when storing the diagnostic information, the slave ECU 12 and the slave ECU 14 store the vehicle local time 20 provided from the master ECU 11 all together. Therefore, the time used as the storing time of the diagnostic information can be managed uniformly in the master ECU 11.

In addition, for each of the slave ECUs 12 to 14, the simultaneous storing request is transmitted together with the in-vehicle local time at the transmission timing of the in-vehicle local time 20. Therefore, the vehicle local time stored with the diagnostic information is determined clearly on the side of the slave ECUs. Suppose a different configuration, in which the simultaneous storing request and the in-vehicle local time are received at separate timings, respectively. In such a configuration, it is necessary to determine whether to employ the in-vehicle local time, which is received immediately before reception of the simultaneous storing request or whether to employ the in-vehicle local time, which is received immediately after reception of the simultaneous storing request, as the vehicle local time stored with diagnostic information.

In a case where, for example, ten of the simultaneous storing requests are continually transmitted, the timing of the processing may be delayed. In such a case, the time elapses after receiving a large number of the simultaneous storing requests until the simultaneous storing requests are processed, and meanwhile, the vehicle local time proceeds in the slave ECU. Consequently, the time, at which the simultaneous storing requests were received, becomes inaccurate. Contrary, the present configuration enables to store the vehicle local time together with the simultaneous storing request thereby to avoid causing inaccurate time record.

Other Embodiment

As described above, although the embodiment has been described, the scope of the present disclosure is not limited to the embodiment. The scope of the present disclosure includes various forms, which can produce a function of each subject matter of the present disclosure. For example, the following forms are also included in the present disclosure.

(1) In the above-described embodiment, the simultaneous storing request is transmitted from the slave ECUs 12 to 14 to the master ECU 11. It is noted that, the simultaneous storing request may be transmitted from an ECU, other than the slave ECUs 12 to 14 in the vehicular system 1, to the master ECU 11.

Figure 12:
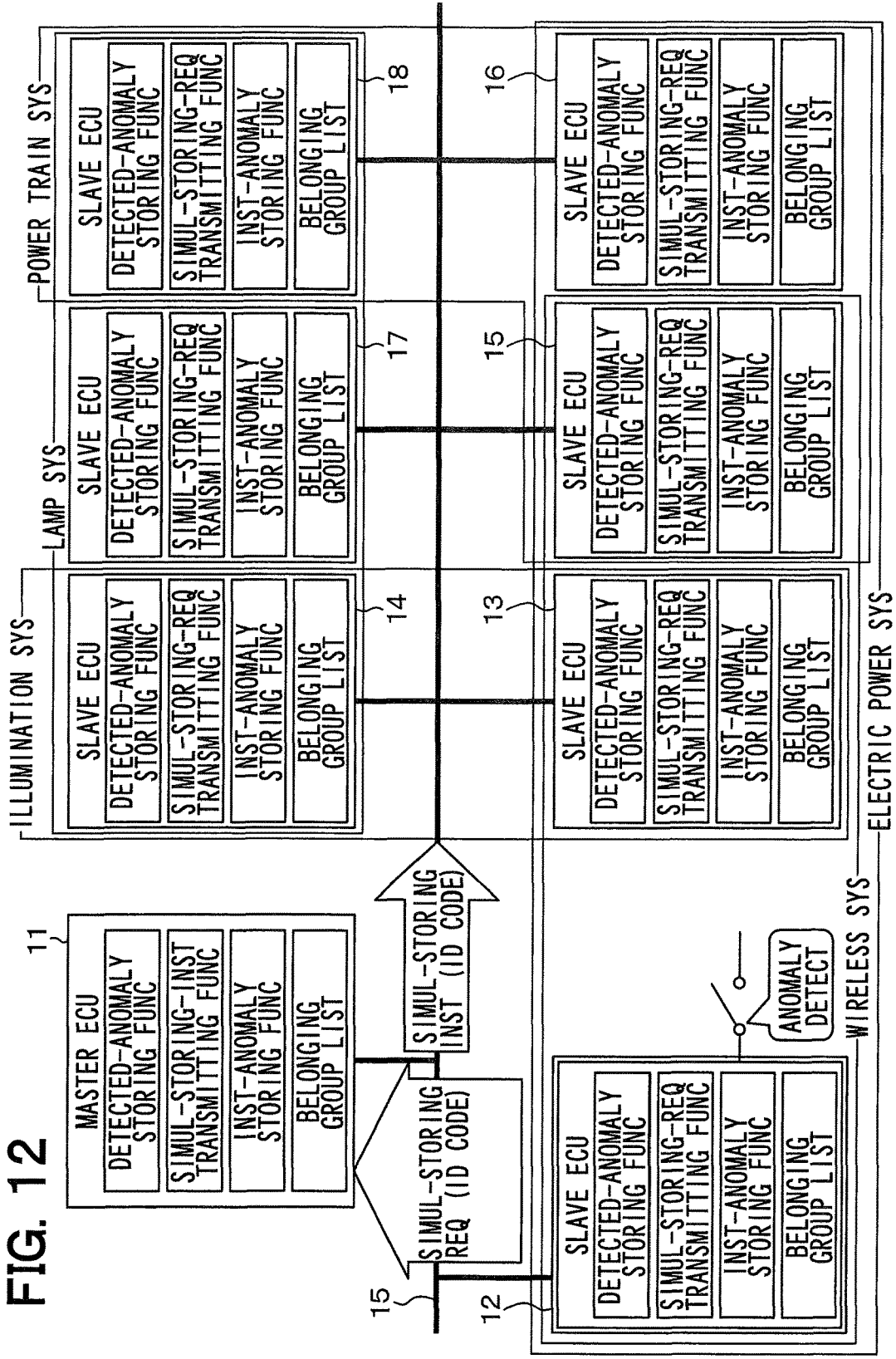
FIG. 12 is a view showing a configuration of a vehicular system according to another embodiment.

For example, as shown in FIG. 12, the vehicular system 1 may further include slave ECUs 15 to 18, in addition to the ECUs 11 to 14. The slave ECUs 15 to 18 are connected to the in-vehicle LAN 15 and may be configured to transmit the simultaneous storing request to the master ECU 11, on occurrence of an anomaly such as a malfunction of the self device. The slave ECUs 15 to 18 may include the same functions as the above-described functions of the slave ECUs 12 to 14.

Furthermore, in the above-described embodiment, the simultaneous storing request is transmitted at the time t51, on detection of a malfunction of the slave ECU 13. It is noted that, any of the slave ECUs 12, 14 to 18 may transmit the simultaneous storing request at another time point on detection of an anomaly such as a malfunction of the self device. In this case, the operation of the slave ECU on detection of a malfunction may be the same as the operation of the slave ECU 13 subsequent to the time t51.

As described above, any of the slave ECUs 12 to 18 has a detected-anomaly-on-self-device storing function to store the diagnostic information in the retention storage medium of the self device on detection of an anomaly such as a malfunction in the self device. The detected-anomaly-on-self-device storing function may be equivalent to the processing at step 240 subsequent to step 230 on detection of an anomaly such as a malfunction in the self device. Any of the slave ECUs 12 to 18 further has a simultaneous-storing-request transmitting function to select the simultaneous storing request including the system identification code corresponding to the anomaly, on detection of an anomaly such as a malfunction in the self device, and to transmit the selected simultaneous storing request to the master ECU 11. The simultaneous-storing-request transmitting function may be equivalent to the processing at steps 250 to 290. Any of the slave ECUs 12 to 18 further has an instruction-correspondence storing function to store the diagnostic information including the input-and-output data corresponding to the system identification code in the retention storage medium of the self device, on reception of the simultaneous storing request from the master ECU 11, when the belonging group list of the self device includes the system identification code included in the simultaneous storing request. The instruction-correspondence storing function is also not to store the diagnostic information in the retention storage medium of the self device when the belonging group list of the self device does not include the system identification code included in the simultaneous storing request. The instruction correspondence storing function may be equivalent to the processing at steps 240*a* and 240*b*. With the present configuration, even when any of the slave ECUs detects an anomaly, the data related to the anomaly can be stored in another slave ECU.

With the present configuration, each of the slave ECUs 12 to 18 transmits, on detection of an anomaly in the self device in a certain case, the simultaneous storing request including the system identification code (one example of a first system identification code) corresponding to the anomaly to the master ECU 11 (one example of a storing instruction transmitting device). In response to this, the master ECU 11 is caused to transmit the simultaneous storing instruction (one example of a first storing instruction) including the system identification code. The simultaneous storing request is one example of a first storing request.

In another case, it is assumed that the master ECU 11 transmits the simultaneous storing instruction (one example of a second storing instruction), on reception of another simultaneous storing request (one example of a second storing request) than the above-described simultaneous storing request, from another slave ECU, such as the slave ECU 12, (one example of another device) other than the slave ECU, such as the slave ECU 15. In this case, the master ECU 11 determines, on reception of the simultaneous storing instruction, and according to the system identification code (one example of a second system identification code) included in the received simultaneous storing instruction, whether to store the diagnostic information in the slave ECU. On determination to store the diagnostic information, the master ECU 11 stores the diagnostic information including the data corresponding to the system identification code in the storage medium of the self device.

The present configuration enables each of the slave ECUs 12 to 18 to store the diagnostic information in another device according to the anomaly detected in the self device. In addition, when an anomaly is detected in another device, the diagnostic information can be stored in the self device.

Similarly to the slave ECUs 12 to 18, the master ECU 11 may store the belonging group list and the stored data correspondence table of the self device. In this case, the master ECU 11 may implement the processings in FIG. 4, FIG. 5, FIG. 9, in addition to the processings described in the above embodiment. In this case, it is noted that the subject generated at step 280 is a simultaneous storing command instead of the simultaneous storing request. In addition, the subject transmitted at step 290 is the simultaneous storing command instead of the simultaneous storing request, and the simultaneous storing command is sent to all the ECUs connected to the in-vehicle LAN 15. Similarly to the slave ECUs 12 to 18, the master ECU 11 may store the belonging group list and the stored data correspondence table of the self device. In this case, at step 198, the master ECU 11 may implement the processings of step 240*a*, 240*b* in FIG. 9.

With the present configuration, the master ECU 11 has a detected-anomaly-on-self-device storing function to store the diagnostic information in the retention storage medium of the self device on detection of an anomaly such as a malfunction in the self device. The detected-anomaly-on-self-device storing function may be equivalent to the processing at step 240 subsequent to step 230 on detection of an anomaly such as a malfunction in the self device. In this case, the master ECU 11 further has a simultaneous-storing-instruction transmitting function to select the simultaneous storing instruction including the system identification code corresponding to the anomaly, on detection of an anomaly such as a malfunction in the self device, and to transmit the selected simultaneous storing instruction to all the ECUs 11 to 18. The simultaneous-storing-instruction transmitting function may be equivalent to the processing at step 196. In this case, the master ECU 11 further has an instruction-correspondence storing function to store the diagnostic information including the input-and-output data corresponding to the system identification code in the retention storage medium of the self device, on reception of the simultaneous storing instruction from the master ECU 11 (self device) through the in-vehicle LAN 15, when the belonging group list of the self device includes the system identification code included in the simultaneous storing instruction. The instruction-correspondence storing function is also not to store the diagnostic information in the retention storage medium of the self device when the belonging group list of the self device does not include the system identification code included in the simultaneous storing instruction. The instruction correspondence storing function may be equivalent to the processing at steps 198, 240*a*, 240*b*.

As follows, the belonging state of the slave ECUs 12 to 18 to the groups exemplified in FIG. 12 will be described. The slave ECUs 12, 13, 15 belong to the group of the wireless system. The slave ECUs 12, 13, 15, 16 belong to the group of the electric power control system. The slave ECUs 13 and 14 belong to the group of the illumination system. The slave ECUs 14, 17, 18 belong to the group of a lamplight system. The slave ECUs 15, 16, 18 belong to the group of the power train system. As exemplified here, one ECU may belong to multiple groups.

In an alternative configuration, a user of the diagnostic tool 2 may be enabled to implement a predetermined operation on the operation unit of the diagnostic tool 2 connected to the in-vehicle LAN 15 thereby to cause the diagnostic tool 2 to transmit the simultaneous storing request to the master ECU 11 through the in-vehicle LAN 15. In this case, the contents of the system identification code included in the simultaneous storing request and the malfunction classification code may be specified beforehand. Alternatively, a user of the diagnostic tool 2 may be enabled to set the contents with the operation unit.

In another alternative configuration, the wireless communication device may be connected to the in-vehicle LAN 15, and a center outside the vehicle may implement wireless communications with the wireless communication device. In this case, the simultaneous storing request may be transmitted to the master ECU 11 through the wireless communication device and the in-vehicle LAN 15. In this case, the contents of the system identification code included in the simultaneous storing request and the malfunction classification code may be specified beforehand. Alternatively, the center may be enabled to set the contents with the operation unit.

Specifically, a storing request transmission device, which is configured to transmit the simultaneous storing request to the master ECU 11, may be equipped to the vehicle. Alternatively, the storing request transmission device may be a communication device, such as the diagnostic tool 2, connectable with the in-vehicle LAN 15 as needed. Alternatively, the storing request transmission device may be a communication device, such as the center, located outside the vehicle and configured to implement wireless communications with the master ECU 11.

In the configuration where the communication device outside the vehicle transmits the simultaneous storing request to the master ECU 11, the master ECU 11 implements the same operation as the operation in the case when receiving the simultaneous storing request from the slave ECUs 12 to 14. It is noted that, a configuration may be employed to transmit data, which represents a vehicle local time error, to the sender of the simultaneous storing request, when the vehicle local time does not change normally in the master ECU 11. In this way, the communication device outside the vehicle is enabled to detect an anomaly of the vehicle local time.

(2) In an alternative configuration, a user of the diagnostic tool 2 may be enabled to implement a predetermined operation on the operation unit of the diagnostic tool 2 connected to the in-vehicle LAN 15 thereby to cause the diagnostic tool 2 to transmit the simultaneous storing instruction through the in-vehicle LAN 15 to all the ECUs, which include the ECUs 11 to 14 connected to the in-vehicle LAN 15.

In another alternative configuration, the wireless communication device may be connected to the in-vehicle LAN 15, and a center outside the vehicle may implement wireless communications with the wireless communication device. In this case, the simultaneous storing request may be transmitted through the wireless communication device and the in-vehicle LAN 15 to all the ECUs, which include the ECUs 11 to 14 connected to the in-vehicle LAN 15.

Specifically, a storing request transmission device, which is configured to transmit the storing request to the master ECU 11, may be equipped to the vehicle. Alternatively, the storing request transmission device may be a communication device connectable with the in-vehicle LAN 15 as needed. Alternatively, the storing request transmission device may be a communication device located outside the vehicle and configured to implement wireless communications with the master ECU 11.

A storing instruction transmission device, which is configured to transmit the storing instruction to the vehicular ECU including the ECUs 11 to 14 may be the master ECU 11 equipped to the vehicle. Alternatively, the storing instruction transmission device may be a communication device connectable with the in-vehicle LAN 15 as needed. Alternatively, the storing instruction transmission device may be a communication device located outside the vehicle and configured to implement wireless communications with the master ECU 11.

(3) In the above-described embodiment, the slave ECUs 12 to 14 transmit the simultaneous storing request to the master ECU 11 on detection of a malfunction. In addition, the master ECU 11 transmits the simultaneous storing instruction to each of the ECUs 12 to 14 connected to the in-vehicle LAN 15. That is, the master ECU 11 functions as a repeater device.

It is noted that, the repeater device may be omitted. For example, when one of the slave ECUs 12 to 14 (one example of a first ECU and a storing instruction transmission device) detects a malfunction similarly to the above-described embodiment, the one of the slave ECUs 12 to 14 may transmit not the simultaneous storing request but the simultaneous storing instruction to another ECUs, which includes the master ECU and the other slave ECUs, connected to the vehicular LAN. In this case, on reception of the simultaneous storing instruction, the ECU (one example of a second ECU) may store the diagnostic information in the retention storage medium according to the contents of the simultaneous storing instruction, similarly to the slave ECUs 12 to 14 according to the first embodiment.

(4) In the above embodiment, the master ECU 11 transmits periodically the data frame including the simultaneous storing instruction and the vehicle local time 20. It is noted that, on reception of the multiple simultaneous storing requests from multiple ECUs in the time period after transmitting one data frame before transmitting the subsequent data frame, the master ECU 11 may generate multiple simultaneous storing instructions corresponding to the multiple simultaneous storing requests and may transmit the data frame including the multiple simultaneous storing instructions and the vehicle local time 20 to the slave ECUs 12 to 14.

(5) In the above-described embodiment, the it is assumed that the malfunction that the engine revolution exceeds the allowable range is assigned to the system identification code of the power train system. Therefore, at step 270, the slave ECU 13 generates the system identification code at the value representing the power train system, at the time t52. It is noted that, in an alternative configuration, at step 270 and at the time t52, the slave ECU 13 may generate not the system identification code at the value representing the power train system but the system identification code at a value representing all the ECUs to the malfunction that the engine revolution exceeds the allowable range. With the present configuration, both the simultaneous storing request transmitted from the slave ECU 13 and the simultaneous storing instruction transmitted from the master ECU 11 include the system identification code at the value representing all the ECUs. Therefore, all the slave ECUs 12 to 14, which receive the simultaneous storing instruction, store the diagnostic information with the latest vehicle local time 20 in the retention storage medium.

(6) In the above-described embodiments, the three ECUs 12 to 14 are exemplified as the slave ECUs. It is noted that, the number of the slave ECU(s) included in the vehicular system 1 may be one or two and may be four or more.

(7) In the above-described embodiment, the value of the elapsed time information 21 is incremented by one count for each 1 second. It is noted that, the value of the elapsed time information 21 may be incremented by one count for each another time unit such as 2 seconds, 0.5 second, or 10 seconds. The bit length of the elapsed time information 21 is not limited to 22 bits. The bit length of the validity determination information 22 is not limited to 2 bits.

(8) In the above-described embodiment, the main body ECU is employed as one example of the master ECU 11. It is noted that, the master ECU 11 may be another ECU than the main body ECU. The master ECU 11 may be an ECU for exclusive use to transmit the vehicle local time 20.

(9) In the above-described embodiment, the slave ECU 12 and the slave ECU 13 are for controlling the power train system, and the slave ECU 14 is for controlling the devices of the body system. It is noted that, the purpose of the slave ECUs 12 to 14 are not limited to the above-described example. For example, any one of the slave ECUs 12 to 14 may be for another purpose such as for controlling the air-conditioning system, the brake system, and or the like, other than or in combination of the above-described purposes.

(10) In the above embodiment, the diagnostic tool 2 receives the diagnostic information and the vehicle local time 20 associated to each other from the slave ECU 13. In addition, the diagnostic tool 2 receives the latest vehicle local time 20 from the same slave ECU 13. It is noted that, the combination of the diagnostic tool 2 and the ECU in transmission of the information is not limited to the above-described example. The diagnostic tool 2 may receive the latest vehicle local time 20 from another ECU such as any of the ECUs 11, 12, 14 in the vehicular system than the ECU 13.

(11) In above-described embodiment, in the case where the time counter device for measuring the absolute time is included in the vehicular system 1, the ECU 11 may retrieve the absolute time from the time counter device thereby to correct the change rate of the value of the elapsed time information 21. For example, it is assumed a case where the elapsed time information 21 changes by T1+ΔT seconds, although it has elapsed by T1 seconds according to the absolute time retrieved from the time counter device. In this case, at steps 110 and 150 in FIG. 3, it may be determined whether it has elapsed by (1000 millisecond×T1/(T1+ΔT)) seconds has elapsed, instead of the determination whether it has elapsed by 1000 milliseconds.

(12) In the above embodiment, the IG device (ignition system) is exemplified as the main power source of the vehicle. It is noted that, the main power source of the vehicle is not limited to the IG device. In a case where the vehicle is an electric vehicle, a main electric power source for supplying electricity to an electric motor for driving the vehicle may be exemplified as the main power source of the vehicle.

(13) In above-described embodiment, each function produced by execution of a program by the CPU of the control circuit in each of the ECUs 11 to 14 may be produced by another hardware such as an FPGA, which can program a circuit structure having the function.

The above-described vehicular system equipped to the vehicle may include: the master ECU (11); the first slave ECU (12); and the second slave ECU (13). The second slave ECU (13) may be configured to transmit the storing request to the master ECU (11), on detection of a malfunction. The master ECU (11) may be configured to transmit the storing instruction for causing the diagnostic information to be stored, on reception of the storing request. The first slave ECU (12) may be configured, on reception of the storing instruction transmitted from the master ECU (11): to generate the diagnostic information on the first slave ECU (12); and to store the generated diagnostic information in the retention storage medium, the retention storage medium being configured to retain the validity determination information in a condition where the first slave ECU is not supplied with electric power source.

With the present configuration, the storing request is transmitted from the second slave ECU (13) to the master ECU (11). In addition, the storing instruction is transmitted, on reception of the storing request, from the master ECU (11) to the first slave ECU (12). In addition, the first slave ECU (12) stores, on reception of the storing instruction, the diagnostic information on the first slave ECU (12).

With the present configuration, even when the second slave ECU (13) detects a malfunction, diagnostic information is generated and stored in the ECU (first slave ECU (12)) other than the second slave ECU (13).

The second slave ECU (13) may be further configured to include the malfunction classification code, which represents the classification of the malfunction, in the storing request to be transmitted to the master ECU (11). The master ECU (11) may be further configured to include the malfunction classification code, which is included in the storing request received from the second slave ECU (13), in the storing instruction to be transmitted. The first slave ECU (12) may be further configured to include the malfunction classification code, which is included in the storing instruc-tion received from the master ECU (11), in the diagnostic information on the first slave ECU (12).

The present configuration enables easily to specify the classification of the malfunction, which is detected by another ECU, causing the first slave ECU (12) to store the diagnostic information.

The second slave ECU (13) may be further configured to include the predetermined system identification code in the storing request to be transmitted to the master ECU (11). The master ECU (11) may be further configured to include the system identification code, which is included in the storing request received from the second slave ECU (13), in the storing instruction to be transmitted. The first slave ECU (12) may be further configured to determine whether to store the diagnostic information on the first slave ECU (12) according to the system identification code included in the storing instruction received from the master ECU (11).

With the present configuration, the second slave ECU (13) is enabled to control whether to cause the first slave ECU (12) to generate and store the diagnostic information by using the system identification code.

The system identification code, which the second slave ECU (13) includes in the storing request, may be the system identification code related to the detected malfunction. The first slave ECU (12) may be further configured: to store the diagnostic information on the first slave ECU (12), when the system identification code, which is included in the storing instruction received from the master ECU (11), is a code corresponding to a group to which the first slave ECU (12) belongs; and not to store the diagnostic information on the first slave ECU (12), when the system identification code, which is included in the storing instruction received from the master ECU (11), is not a code corresponding to the group to which the first slave ECU (12) belongs.

With the present configuration, when the first slave ECU (12) belongs to the group related to a malfunction occurring in the second slave ECU (13), the diagnostic information is stored by the first slave ECU (12). Alternatively, when the first slave ECU (12) does not belong to the group, the diagnostic information is not stored by the first slave ECU (12). Therefore, information useful for analysis of the malfunction can be selectively stored, and the resource for storing the diagnostic information can be restrained.

The first slave ECU (12) may be further configured: to select data according to the system identification code included in the storing instruction received from the master ECU (11); and to include the selected data in the diagnostic information and store the diagnostic information.

With the present configuration, data related to a malfunction occurring in the second slave ECU (13) can be selectively stored, thereby to restrain a resource for storing the diagnostic information.

The vehicular system may further include a third slave ECU (14). The master ECU (11) may be further configured: to change the value of the elapsed time information (21) by a time unit according to the elapse of the time; to generate the vehicle local time (20) including the elapsed time information (21); and to transmit the generated vehicle local time (20) with the storing instruction to the first slave ECU (12). The first slave ECU (12) may be further configured, on reception of the vehicle local time (20) and the storing instruction from the master ECU (11): to associate the diagnostic information on the first slave ECU (12) with the vehicle local time (20); and to store the associated diagnostic information on the first slave ECU (12) and the vehicle local time (20) in the retention storage medium. The third slave ECU (14) may be configured, on reception of the vehicle local time (20) and the storing instruction from the master ECU (11): to associate the diagnostic information on the third slave ECU (14) with the vehicle local time (20); and to store the associated diagnostic information on the third slave ECU (14) and the vehicle local time (20) in the retention storage medium, the retention storage medium being configured to retain the validity determination information in a condition where the third slave ECU is not supplied with electric power source.

With the present configuration, when storing the diagnostic information, the first slave ECU (12) and the third slave ECU (14) store the vehicle local time (20) provided from the master ECU (11) all together. Therefore, the time used as the storing time of the diagnostic information can be managed uniformly in the master ECU (11).

The vehicular system equipped to the vehicle includes the first ECU and the second ECU. The first ECU may be configured to transmit the storing instruction for causing diagnostic information to be stored, on detection of a malfunction. The second ECU may be configured, on reception of the storing instruction transmitted from the first ECU: to generate diagnostic information on the second ECU; and to store the generated diagnostic information on the second ECU in the retention storage medium, the retention storage medium being configured to retain the validity determination information in a condition where the second ECU is not supplied with electric power source.

With the present configuration, the storing instruction is transmitted from the first ECU to the second ECU, and the second ECU, which receives the storing instruction, stores the diagnostic information on the second ECU. With the present configuration, even when the first ECU detects a malfunction, the diagnostic information is generated and stored in the second ECU.

The ECU equipped to the vehicle may be configured, on reception of the storing instruction from the outside: to generate the diagnostic information on the ECU; and to store the generated diagnostic information in the retention storage medium, the retention storage medium being configured to retain the validity determination information in a condition where the ECU is not supplied with electric power source.

The storing instruction transmission device may be configured to transmit the storing instruction to the vehicular ECU (11 to 14), the vehicular ECU (11 to 14) being configured, on reception of the storing instruction from the outside: to generate diagnostic information on the self device; and to store the generated diagnostic information in the retention storage medium, the retention storage medium being configured to retain validity determination information in a condition where the self device is not supplied with electric power source. Thus, the present disclosure may also encompass the storing instruction transmission device configured to transmit the storing instruction to the vehicular ECU (11 to 14).

The storing instruction transmission device is equipped to the vehicle and may be configured, on reception of the storing request from the outside, to transmit the storing instruction to the vehicular ECU (11 to 14).

The present disclosure may further encompass the storing request transmission device configured to transmit the storing request to the storing instruction transmission device.

The ECU communicable with the storing instruction transmission device (11) may include the storing request transmission unit configured, on detection of an anomaly by the self device, to transmit the first storing request, which includes the first system identification code corresponding to the anomaly, to the storing instruction transmission device (11) thereby to cause the storing instruction transmission device (11) to transmit the first storing instruction, which includes the first system identification code.

The ECU may further include the instruction correspondence storing unit configured to receive the second storing instruction, when the storing instruction transmission device (11) transmits the second storing instruction on reception of the second storing request from a device other than the ECU; to determine whether to store the diagnostic information on the ECU, according to the second system identification code included in the received second storing instruction; and to store the diagnostic information, which includes data corresponding to the second system identification code, in the storage medium of the self device, on determination to store.

The present configuration enables one ECU to store the diagnostic information in another device according to the anomaly detected in the self device. In addition, when an anomaly is detected in another device, the diagnostic information can be stored in the self device.

The above-described numeral in the parentheses does not limit the relationship between the numeral and the related element in the disclosure.

The above structures of the embodiments can be combined as appropriate. The above processings such as calculations and determinations may be performed by any one or any combinations of software, an electric circuit, and the like. The software may be stored in a non-transitory computer readable medium, and may be transmitted via a transmission device such as a network device. The electric circuit may be an integrated circuit, and may be a discrete circuit. The elements producing the above processings may be discrete elements and may be partially or entirely integrated.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A vehicular system equipped to a vehicle, the vehicular system comprising:
    a master ECU generating a vehicle local time periodically and repeatedly;
    a first slave ECU receiving the vehicle local time from the master ECU; and
    a second slave ECU receiving the vehicle local time from the master ECU, wherein
    the second slave ECU is configured to generate diagnostic information and to transmit a storing request to the master ECU when the second slave ECU detects a malfunction,
    the second slave ECU is further configured to generate a system identification code in the storing request to be transmitted to the master ECU,
    the master ECU is configured to transmit a storing instruction to the first slave ECU and the second slave ECU when receiving the storing request from the second slave ECU so that the first slave ECU and the second slave ECU store the diagnostic information generated by the second slave ECU in association with the vehicle local time generated by the master ECU, the master ECU is further configured to receive the system identification code from the second slave ECU and to transmit the system identification code to the first slave ECU, and the first slave ECU is further configured to determine whether to store the diagnostic information on the first slave ECU based on the system identification code received from the master ECU.

2. The vehicular system according to claim 1, wherein the second slave ECU is further configured to generate a malfunction classification code representing a classification of the malfunction and to include the malfunction classification code in the storing request to be transmitted to the master ECU, the master ECU is further configured to receive the malfunction classification code included in the storing request received from the second slave ECU and to include the malfunction classification code in the storing instruction, and the first slave ECU is further configured to receive the malfunction classification code included in the storing instruction received from the master ECU.

3. The vehicular system according to claim 1, wherein the system identification code generated by the second slave ECU in the storing request is related to the detected malfunction, and the first slave ECU is further configured:

to store the diagnostic information on the first slave ECU when the system identification code included in the storing instruction received from the master ECU corresponds to a group to which the first slave ECU belongs; and not to store the diagnostic information on the first slave ECU when the system identification code included in the storing instruction received from the master ECU does not correspond to the group to which the first slave ECU belongs.

4. The vehicular system according to claim 1, wherein the first slave ECU is further configured:

to select data according to the system identification code included in the storing instruction received from the master ECU; and to include the selected data in the diagnostic information and store the diagnostic information.

* * * * *